(12) United States Patent
Warburton et al.

(10) Patent No.: US 11,457,630 B2
(45) Date of Patent: Oct. 4, 2022

(54) WOOD PRESERVATIVE FORMULATIONS COMPRISING ISOTHTAZOLONES WHICH PROVIDE PROTECTION AGAINST SURFACE STAINING

(71) Applicant: Arch Timber Protection Limited, Castleford (GB)

(72) Inventors: Paul Stuart Warburton, Normanton (GB); Lee MAson, Camblesforth (GB); Andrew Stewart Hughes, Pontefract (GB)

(73) Assignee: Arch Timber Protection Limited, Castleford (GB)

( * ) Notice: Subject to any disclaimer, the term of this patent is extended or adjusted under 35 U.S.C. 154(b) by 0 days.

(21) Appl. No.: 15/354,585

(22) Filed: Nov. 17, 2016

(65) Prior Publication Data

US 2017/0064960 A1 Mar. 9, 2017

Related U.S. Application Data

(62) Division of application No. 13/639,399, filed as application No. PCT/GB2011/000579 on Apr. 13, 2011, now abandoned.

(30) Foreign Application Priority Data

Apr. 13, 2010 (GB) .................................. 1006171

(51) Int. Cl.
| | |
|---|---|
| *A01N 43/80* | (2006.01) |
| *A01N 37/02* | (2006.01) |
| *A01N 37/10* | (2006.01) |
| *A01N 43/653* | (2006.01) |
| *B27K 3/34* | (2006.01) |
| *B27K 3/42* | (2006.01) |
| *B27K 3/50* | (2006.01) |
| *A01N 43/50* | (2006.01) |
| *A01N 43/52* | (2006.01) |
| *A01N 53/00* | (2006.01) |
| *A01N 25/04* | (2006.01) |
| *A01N 43/84* | (2006.01) |

(52) U.S. Cl.
CPC ............. *A01N 43/80* (2013.01); *A01N 25/04* (2013.01); *A01N 43/50* (2013.01); *A01N 43/52* (2013.01); *A01N 43/653* (2013.01); *A01N 43/84* (2013.01); *A01N 53/00* (2013.01); *B27K 3/343* (2013.01); *B27K 3/42* (2013.01); *B27K 3/50* (2013.01); *B27K 3/34* (2013.01); *B27K 2240/20* (2013.01)

(58) Field of Classification Search
CPC .................................................... A01N 43/80
See application file for complete search history.

(56) References Cited

U.S. PATENT DOCUMENTS

| 5,112,396 | A | 5/1992 | Hegarty |
| 2009/0130475 | A1 | 5/2009 | Castillo et al. |

FOREIGN PATENT DOCUMENTS

| WO | 2006/031743 A2 | 3/2006 |
| WO | 2008/047097 A1 | 4/2008 |
| WO | 2009/133374 A2 | 11/2009 |

OTHER PUBLICATIONS

Clausen, "Ibuprofen inhibits in vitro growth of brown-rot fungi." International Research Group on Wood Preservation IRG/WP 96-10160. Stockholm, Sweden, 1998 (7 pages).

*Primary Examiner* — Yong S. Chong
(74) *Attorney, Agent, or Firm* — Dority & Manning, P.A.

(57) ABSTRACT

The present invention provides a wood preservative formulation comprising an isothiazolone, an organic fungicidal timber decay preservative and an unsaturated carboxylic or sulphonic acid, salt or anhydride thereof. The formulations of the invention are surprisingly effective at protecting wood and other cellulosic substrates, in particular at providing prolonged protection against in-service surface staining. The invention also provides methods for treating wood and other cellulosic substrates with said formulations.

19 Claims, 9 Drawing Sheets

WOOD PRESERVATIVE FORMULATIONS COMPRISING ISOTHIAZOLONES WHICH PROVIDE PROTECTION AGAINST SURFACE STAINING

CROSS-REFERENCE TO RELATED APPLICATIONS

This application is a Divisional of U.S. patent application Ser. No. 13/639,399, filed Nov. 28, 2012, which is also a 371 of PCT/GB2011/000579, filed Apr. 13, 2011, which in turn claims the benefit of British Patent Application No. 1006171.1, filed Apr. 13, 2010, the contents of each of which are incorporated herein by reference.

FIELD OF THE INVENTION

The present invention relates to formulations for protecting wood and other cellulosic substrates against decay and staining by fungi and other organisms.

BACKGROUND OF THE INVENTION

Timber based products are subject to attack from various types of organism, including moulds, fungi and insects such as termites. Depending on the environmental conditions in which the timber based product is used, some types of attack are more prevalent than others. For example, timber products that remain indoors tend to dry out and have a low moisture content, whereas timber products used outdoors and exposed to environmental conditions such as rain will tend to have a much higher moisture content. Likewise, timber products that remain in water during use, such as timber products used in marine applications such as jetties and the like, face different threats to timber products stored in soil or above ground. Consequently, different types of preservative compositions are required, depending on the conditions which the treated timber will be exposed to during normal use.

The EN335 standard is a classification system commonly used to categorise the different environmental conditions that wood is exposed to during normal use. EN335 UC1 corresponds to under cover, fully protected timber that is not exposed to wetting or high humidity. EN335 UC2 is also under cover, fully protected from the weather, but where high environmental humidity can lead to occasional but not persistent wetting. The moisture content of wood in the EN335 UC2 classification is however still low at less that 20%. EN335 UC3 corresponds to exterior wood, kept above ground as either protected or unprotected. The unprotected sub-category in this standard is further divided depending on the frequency of exposure to moisture. In practice, whether a given application falls into one or the other unprotected category can depend on the climatic conditions such as annual rainfall.

Generally wood for external exposure without a coating (EN335 UC3.2/3.3) is treated with preservatives containing biocidal metals such as copper. Commonly used non-metal based alternatives include 3-iodo-2-propynyl-butyl carbamate (IPBC), quaternary ammonium chlorides such as benzalkonium chloride, borates, triazoles, alkylamines and the like.

As well as decay which leads to a reduction in mass and structural integrity, wood and other cellulosic substrates can undergo staining and discolouration of the surface. Although normally only superficial, such staining is often undesirable. Sapstaining is surface staining that occurs due to fungi that colonise freshly felled wood (i.e. wood full of sap before drying and processing). However, even if sapstaining is avoided, surface staining may still occur on processed wood in service due to fungi that colonise the dried, processed wood which grow when there is either elevated humidity or when the wood is exposed to moisture in service.

Antisapstain chemicals are used to protect freshly felled timber to prevent sapstaining. Standard antisapstain chemicals include chlorophenol, 2-(thiocyanomethylthio) benzothiazole (TCMTB), 3-iodo-2-propynyl butyl carbamate (IPBC) and didecyldimethyl ammonium chloride (DDAC). Such formulations are intended to provide short term protection of the order of up to 6 months, more typically only 1 to 2 months. As antisapstain formulations are intended only to provide temporary protection against staining, they are typically applied by dipping methods (i.e. they are not usually applied by vacuum impregnation).

Wood preservatives developed for EN335 UC2 and UC3 applications are designed to prevent fungal decay but are not required to provide protection against surface staining. Although metal based systems for preventing fungal decay can provide protection against surface staining, metal based wood preservative formulations typically impart a colour to the wood. More recently, there is growing pressure on reducing the use of biocidal metals as wood preservatives due to environmental concerns. However, non-metal based alternatives such as azoles typically only provide protection against fungal decay, and offer little protection against surface staining. The prevention of in service surface staining may be commercially desirable, even if the EN335 standard does not require it.

Carboxylic acids are known as coformulants in wood preservative compositions. For example, U.S. Pat. No. 5,186,947 describes the use of carboxylic acids as metal-fixing agents, to ensure that biocidal metal ions penetrate effectively into the wood. Sodium benzoate is typically added as an anticorrosion additive, to mitigate the corrosive effects that of wood preservative formulations have on equipment such as steel dipping tanks, as well as metal fixings such as screws and the like attached to the treated wood itself. WO2009/133374 discloses formulations containing unsaturated carboxylic or sulphonic acids in combination with haloalkynyl compounds such as IPBC, and indicates that the acid has a stabilising effect on the IPBC.

The present inventors have surprisingly found that a class of compounds, isothiazolones, which are generally used as in-can sterilants (to prevent the formulation itself becoming mouldy), can combine with a fungicide such as an azole and an acid such as a carboxylic acid to provide a highly effective wood preservative formulation which also offers protection against in service surface staining.

U.S. Pat. No. 5,112,396 discloses the use of isothiazolones in an antisapstain composition. However, their use has been limited because any antisapstain activity requires them to be employed at very high concentrations. Use of isothiazolones at these high concentrations can lead to skin sensitization. Surprisingly, the formulations prepared by the present inventors display significant synergy between the active components which provides prolonged protection against in-service staining at surprisingly low concentrations of isothiazolone.

SUMMARY OF THE INVENTION

Thus, the present invention provides a wood preservative formulation comprising an isothiazolone, an organic fungicidal timber decay preservative and an unsaturated carboxylic or sulphonic acid, salt or precursor thereof.

By "unsaturated carboxylic acid" and "unsaturated sulphonic acid" is meant any carboxylic or sulphonic acid that also contains a carbon-carbon double bond. Suitable acids include linear, cyclic or aromatic carboxylic or sulphonic acids.

By "precursor" is meant any group that can be hydrolysed to form a carboxylic or sulphonic acid or its conjugate base. Suitable precursors include esters, amides and anhydrides of carboxylic or sulphonic acids, with esters and anhydrides being preferred. Preferably, the precursor compound is non-polymeric.

Typically, when the formulation contains a precursor of an unsaturated carboxylic or sulphonic acid, the composition may also contain a coadditive such as a base (e.g. sodium hydroxide, potassium hydroxide or the like) to facilitate formation of the acid during use of the formulation. However, such coadditives are not essential, particularly when using precursors such as anhydrides that can easily be hydrolysed to free carboxylic or sulphonic acids.

The formulations preferably comprise unsaturated carboxylic or sulphonic acids or salts thereof, wherein the salt does not contain a biocidal metal ion. By "biocidal metal ion" is meant any metal ion that has a biocidal effect. Examples of biocidal metal ions include copper, silver, zinc, cobalt, nickel, manganese, zirconium, chromium, antimony, lead, mercury and the like.

Carboxylic acids and their salts and precursors are preferred.

Preferred salts of the unsaturated acid are alkali metal salts, and alkaline earth metal salts. Preferably, alkali metal salts are used. Preferred alkali metals are sodium and potassium.

In one preferred embodiment, the acids are unsaturated cyclic carboxylic acids. Most preferred are unsaturated cyclic monocarboxylic acids.

The unsaturated cyclic acid, salt or precursor thereof may be an aromatic acid, salt or precursor thereof. Suitable aromatic groups include five membered heteroaromatic groups such as furyl, pyrrolyl, and thienyl; six membered aromatic and heteroaromatic groups such as phenyl, pyridyl, pyrazinyl, pyrimidinyl, and pyridazinyl; 9 membered heteroaromatic groups such as indolyl, isoindolyl, and benzimidazyl; and 10 membered aromatic and heteroaromatic groups such as naphthyl, quinolyl, and isoquinolyl. Preferred aromatic or heteroaromatic groups are furyl, pyrrolyl, thienyl, pyridyl, phenyl and naphthyl. Most preferred is phenyl.

Preferred aromatic acids are represented by the general formula (I)

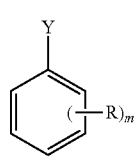

(I)

wherein Y denotes $CO_2M$ or $SO_3M$;

each R independently denotes $C_1$-$C_{12}$ alkyl, OH, OMe, OEt, $NH_2$, $NMe_2$, $CO_2M$ or halogen, wherein two R groups may optionally form naphthyl (i.e. two R groups may combine to form —$(CH)_4$—);

M denotes H, K or Na;

and m denotes 0 to 5.

Preferably,

Y denotes $CO_2M$ or $SO_3M$;

each R independently denotes $C_1$-$C_4$ alkyl, OH, OMe, OEt, $NH_2$, $NMe_2$, $CO_2M$ or halogen, wherein two R groups may optionally form naphthyl (i.e. two R groups may combine to form —$(CH)_4$—);

M denotes H, K or Na;

and m denotes 0 to 5.

Preferably, R denotes $C_1$-$C_4$ alkyl, $CO_2H$ or OH and m denotes 0 to 2. More preferably, R denotes OH and m denotes 0 or 1.

Preferred aromatic acids and salts are benzoic acid, sodium benzoate, salicyclic acid, sodium salicyclate, phthalic acid (or phthalic anhydride), sodium dodecyl benzene sulphonate, benzene sulphonic acid, p-toluene sulphonic acid, sodium tosylate, phenol sulphonic acid, naphthanoic acid, and naphthalene sulphonic acid.

More preferred aromatic acids and salts are benzoic acid, sodium benzoate, salicyclic acid, sodium salicyclate, phthalic acid (or phthalic anhydride), benzene sulphonic acid, p-toluene sulphonic acid, sodium tosylate, phenol sulphonic acid, naphthanoic acid, and naphthalene sulphonic acid. Particularly preferred aromatic acids are benzoic acid, sodium benzoate, salicyclic acid, and sodium salicyclate, with alkali metal salts of benzoic acid and particularly sodium benzoate being the most preferred.

Alternatively, or in addition to aromatic acids, the unsaturated cyclic acid, salt or precursor thereof may be an unsaturated polycyclic acid. Preferred unsaturated polycyclic acids are resin acids. Resin acids are produced by parenchymatous epithelial cells that surround the resin ducts in trees from temperate coniferous forests. Typically, the formulations of the present invention will use a mixture of resin acids in the form of rosin, or other naturally derived resins.

Rosin (also termed rosin acid) is a solid form of resin produced by heating fresh liquid resin to vaporise the volatile liquid terpene components. Rosin consists mainly of abietic acid, and in a higher concentration than the level found in resin.

A further derivative containing resin acids that may be used in the formulation of the present invention is tall oil. Tall oil (also called liquid rosin) is obtained as a by-product of the Kraft process of wood pulp manufacture. Crude tall oil contains rosin, resin acids (mainly abietic acid and its isomers), fatty acids (mainly palmitic, oleic and linoleic acids) fatty alcohols, sterols and alkyl hydrocarbon derivatives.

Preferred resin acids are abietic-type acids such as abietic acid, neoabietic acid, dehydroabietic acid, and palustric acid, as well as pimaric-type acids such as pimaric acid, levopimaric acid, isopimaric acid. Most preferred are abietic acid, sodium abietate, pimaric acid and sodium pimarate.

Other types of unsaturated cyclic acids that may be used include dehydroacetic acid.

Preferred unsaturated cyclic acids are therefore selected from benzoic acid, salicyclic acid, dehydroacetic acid, dodecyl benzene sulfonic acid, abietic acid, or salts (particularly sodium or potassium salts) or methyl esters thereof.

As an alternative, or in addition to, the unsaturated cyclic acid, the unsaturated acid component may comprise a linear unsaturated acid, salt or precursor thereof. By "linear" is meant a branched or unbranched alkenyl chain. However, unbranched alkenyl chains are preferred. The linear unsaturated acid may be a mono or a dicarboxylic or sulphonic acid, wherein the acid groups are at the end of the alkenyl chain. Carboxylic acids are preferred, with monocarboxylic acids, salts or precursors thereof being the most preferred.

The linear unsaturated acid may be of any length, although preferably the unsaturated acid has at least 4 carbon atoms, more preferably from 6 to 22 carbon atoms, more preferably from 6 to 18 carbon atoms, most preferably from 6 to 8 carbon atoms.

Preferred linear unsaturated monocarboxylic acids include sorbic acid, myristoleic acid, palmitoleic acid, oleic acid, elaidic acid, linoleic acid, α-linolenic acid, arachidonic acid, eicosapentaenoic acid, euric acid, and docosahexanoic acid. Preferred unsaturated monocarboxylic acids include sorbic acid, myristoleic acid, palmitoleic acid, oleic acid, elaidic acid, linoleic acid, and α-linolenic acid. Preferably, the linear unsaturated monocarboxylic acid is an ω-9 or ω-6 fatty acid (or a mixture thereof), with ω-6 acids being preferred.

In a preferred embodiment, the linear unsaturated carboxylic or sulphonic acids are alkali metal salts and esters. Preferred alkali metal salts are sodium and potassium.

In a preferred embodiment, the unsaturated acid precursor is a glycerol ester of an unsaturated fatty carboxylic acid.

Especially preferred unsaturated monocarboxylic acids include sorbic acid and oleic acid and salts thereof, with sorbic acid being preferred. Alkali metal salts of sorbic acid are particularly preferred, with the most preferred being sodium sorbate and potassium sorbate.

Preferred linear unsaturated dicarboxylic acid include fumaric acid, maleic acid (or maleic anhydride). Most preferred is fumaric acid.

These linear unsaturated carboxylic acids may be present in the formulation of the present invention as pure acids, or as part of a mixture of different acids. Optionally, these mixtures may be in the form of a natural oil such as tall oil, linseed oil, castor oil, corn oil, coconut oil, olive oil or fish oils such as cod liver oil. Tall oil and linseed oil are particularly preferred.

The acids are typically relatively weak, i.e. with a pKa above 4.0.

The most preferred linear unsaturated acid is oleic acid and salts or methyl esters thereof, preferably oleic acid and salts thereof, with oleic acid itself (i.e. not a salt thereof) being the most preferred.

Thus, it is particularly preferred for the unsaturated acid to be selected from the group consisting of resin acids, alkali metal salts of salicyclic acid, for example sodium salicyclate and potassium salicyclate, alkali metal salts of benzoic acid, for example sodium benzoate and potassium benzoate, oleic acid and alkali metal salts of sorbic acid, for example sodium sorbate and potassium sorbate.

Thus, it is particularly preferred for the unsaturated acid to be selected from the group consisting of resin acids, alkali metal salts of salicyclic acid, for example sodium salicyclate and potassium salicyclate, alkali metal salts of benzoic acid, for example sodium benzoate and potassium benzoate, and alkali metal salts of sorbic acid, for example sodium sorbate and potassium sorbate.

The formulations of the present invention also comprise one or more isothiazolone compounds, i.e. compounds comprising a isothiazolone ring.

The isothiazolone may be a isothiazolone or a benzoisothiazolinone. Thus, preferred isothiazolones are represented by the general formula (II)

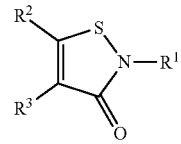

(II)

wherein $R^1$ denotes hydrogen, optionally substituted $C_1$-$C_{18}$ alkyl, $C_2$-$C_8$ alkenyl or alkynyl, $C_2$-$C_8$ haloalkynyl, optionally substituted $C_3$-$C_{12}$ cycloalkyl, optionally substituted aralkyl having up to 10 carbon atoms, or optionally substituted aryl having up to 10 carbon atoms;

$R^2$ and $R^3$ independently denote hydrogen, halogen or $C_1$-$C_4$ alkyl; or together $R^2$ and $R^3$ may provide a 1,2 benzisothiazolin-3-one group (i.e. $R^2$ and $R^3$ may combine to form —$(CH)_4$—).

Preferably, $R^2$ and $R^3$ independently denote chloro or hydrogen, or together $R^2$ and $R^3$ may provide a 1,2 benzisothiazolin-3-one group.

By "substituted alkyl" and "substituted cycloalkyl" is meant an alkyl group having one or more of its hydrogen atoms replaced by another substituent group. Suitable substituents are selected from hydroxy, halo, cyano, carboxy, $C_1$-$C_4$-alkoxy, phenyl, phenoxy, $C_1$-$C_4$-thioalkyl, $C_1$-$C_4$-alkylamine, $C_1$-$C_4$-dialkylamine, phenylamine, and cycloalkylaminoalkyl such as morphilino, piperidino, and pyrrolidonyl.

By "substituted aryl" is meant an aryl group such as phenyl or naphthyl having one or more of the hydrogen atoms on the aryl ring replaced by another substituent group. Suitable substituents are selected from halogen, $C_1$-$C_4$ alkyl and $C_1$-$C_4$ alkoxy.

By "substituted aralkyl" is meant an aralkyl group such as benzyl having one or more of the hydrogen atoms on the aryl ring or on the alkyl chain replaced by another substituent group. Suitable substituents are selected from halogen, $C_1$-$C_4$ alkyl and $C_1$-$C_4$ alkoxy.

Thus, preferred $R^1$ substituents are selected from hydrogen, methyl, ethyl, propyl, isopropyl, butyl, hexyl, octyl, cyclohexyl, 4-methoxyphenyl, 4-chlorophenyl, 3,4-dichlorophenyl, benzyl, 4-methoxybenzyl, 4-chlorobenzyl, 3,4-dichlorobenzyl, phenethyl, 2-(4-methoxyphenyl)ethyl, 2-(4-chlorophenyl)ethyl, 2-(3,4-dichlorophenyl)ethyl, hydroxymethyl, chloromethyl and chloropropyl.

Preferably, the $R^1$ substituents in the compound of formula (II) denotes hydrogen, optionally substituted $C_1$-$C_{18}$ alkyl, optionally substituted aralkyl having up to 10 carbon atoms, or optionally substituted aryl having up to 10 carbon atoms.

More preferably, $R^1$ denotes hydrogen or optionally substituted $C_1$-$C_{18}$ alkyl.

Most preferably, $R^1$ is hydrogen or $C_1$-$C_8$ alkyl, with hydrogen, methyl, butyl and octyl being the most preferred $R^1$ substituents.

Thus, the preferred isothiazolones are those represented by the general formula (II) above, wherein $R^1$ denotes hydrogen or $C_1$-$C_8$ alkyl; and $R^2$ and $R^3$ independently denote chloro or hydrogen, or together $R^2$ and $R^3$ may provide a 1,2 benzisothiazolin-3-one group.

The most preferred isothiazolones are those represented by the general formula (II) above, wherein $R^1$ denotes hydrogen, methyl, butyl or octyl; and $R^2$ and $R^3$ independently denote chloro or hydrogen, or together $R^2$ and $R^3$ may provide a 1,2 benzisothiazolin-3-one group.

Preferred isothiazolones include, but are not limited to, methylisothiazol-3-one (MIT), 5-chloro-2-methyl-4-isothiazolin-3-one (CMIT), 4,5-dichloro-2-n-octyl-4-isothiazolin-3-one (DCOIT), octylisothiazol-3-one (OIT), 1,2-benzisothiazol-3(2H)-one (BIT), N-methyl-1,2-benzisothiazol-3-one (MBIT) and N-(n-butyl)-1,2-benzisothiazol-3-one (BBIT). Particularly preferred isothiazolones include, but are not limited to, methylisothiazol-3-one (MIT), 5-chloro-2-methyl-4-isothiazolin-3-one (CMIT), octylisothiazol-3-one (OIT), 1,2-benzisothiazol-3(2H)-one (BIT), N-methyl-1,2-benzisothiazol-3-one (MBIT) and N-(n-butyl)-1,2-benzisothiazol-3-one (BBIT). Even more preferred isothiazol-3-ones are 5-chloro-2-methyl-4-isothiazolin-3-one (CMIT), octylisothiazolone (OIT), 1,2-benzisothiazol-3(2H)-one (BIT) and N-(n-butyl)-1,2-benzisothiazol-3-one (BBIT), more preferably octylisothiazolone (OIT), 1,2-benzisothiazol-3(2H)-one (BIT) and N-(n-butyl)-1,2-benzisothiazol-3-one (BBIT), with OIT being the most preferred.

The formulations of the present invention additionally comprise one or more organic fungicidal timber decay preservative.

By "organic fungicidal timber decay preservative" is meant an organic fungicide or non-biocidal metal salt thereof (preferably alkali metal salt thereof) which provides long term protection against fungal decay of wood and other cellulosic substrates. By "fungal decay" is meant decay which leads to a reduction in mass and structural integrity of the substrate. By "long term" is meant at least one year, preferably at least two years, more preferably at least five years. Suitably, the organic fungicidal timber decay preservative used in the present invention provides protection against fungal decay of wood when used in EN335 UC3.2/3.3 applications. In particular, protection is provided against basidiomycete fungi.

Suitable organic fungicidal timber decay preservatives that can be used in the present invention would be known to the skilled person. Preferred organic fungicidal timber decay preservatives suitable for use in the formulations of the present invention include fungicidal amides such as prochloraz, dichlofluanid and tolylfluanid; fungicidal aromatic compounds such as chlorthalonil, cresol, dicloran, pentachlorophenol, sodium pentachlorophenol, 2-(thiocyanatomethylthio)-1,3-benzothiazole (TCMBC), dichlorophen, fludioxonil and 8-hydroxyquinoline; fungicidal heterocyclic compounds such as dazomet, fenpropimorph, bethoxazin and dehydroacetic acid; strobilurins such as azoxystrobin; quaternary ammonium compounds; azoles; and mixtures thereof.

More preferred organic fungicidal timber decay preservatives are selected from quaternary ammonium compounds, azoles and fungicidal heterocyclic compounds such as fenpropimorph.

Particularly preferred organic fungicidal timber decay preservatives are quaternary ammonium compounds, azoles, and mixtures thereof.

Preferred quaternary ammonium compounds are trimethyl alkyl quaternary ammonium compounds such as cocotrimethyl ammonium chloride; dialkyldimethyl quaternary ammonium compounds such as didecyl dimethyl ammonium chloride, didecyl dimethyl ammonium carbonate, didecyl dimethyl ammonium bicarbonate, dioctyl dimethyl ammonium chloride and octyl decyl dimethyl ammonium chloride, or mixtures thereof; alkyl dimethyl or diethyl benzyl ammonium salts such as benzalkonium chloride and benzalkonium hydroxide; polyethoxylated quaternary ammonium compounds such as N,N-didecyl-N-methyl-poly(oxyethyl) ammonium propionate (Bardap 26) or N,N-didecyl-N-methyl-poly(oxyethyl) ammonium lactate; and N-substituted pyridinium compounds such as cetyl pyridinium chloride.

Particularly preferred quaternary ammonium compounds are benzalkonium chloride, didecyl dimethyl ammonium chloride and didecyl dimethyl ammonium carbonate, with didecyl dimethyl ammonium chloride and didecyl dimethyl ammonium carbonate being the most preferred.

Particularly preferred organic fungicidal timber decay preservatives are azole compounds, i.e. a compound comprising an azole group. The azole compound may be an imidazole or a 1,2,4-triazole and is preferably represented by the general formula (III)

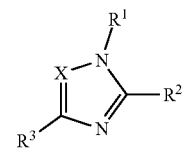

(III)

wherein

X denotes $CR^4$ or N;

$R^1$ denotes hydrogen or a linear, branched, cyclic, aromatic or any combination thereof, saturated or unsaturated, substituted or unsubstituted $C_1$ to $C_{40}$ group wherein any of the carbon atoms other than those bound to the nitrogen atom shown in formula (IV) may be replaced with an optionally substituted hetero atom;

$R^2$ denotes hydrogen, $C_1$-$C_8$ alkyl, $C_2$-$C_8$ alkenyl, $C_6$-$C_{10}$ aromatic, $C_5$-$C_{10}$ heteroaromatic or $C_1$-$C_4$ alkyl carbamate; and $R^3$ and $R^4$ denote hydrogen; or together $R^3$ and $R^4$ may provide a benzimidazole group (i.e. $R^3$ and $R^4$ may combine to form —(CH)$_4$—).

The formulations of the invention may contain one or more azole compounds, such as mixtures of an imidazole and a 1,2,4-triazole, or mixtures of two or more 1,2,4-triazoles. Using a mixture of azoles may allow a broader range of activity against fungi. However, it is preferred to use 1,2,4-triazoles in the formulations of the invention.

The imidazole compound incorporates a five-membered diunsaturated ring composed of three carbon atoms and two nitrogen atoms at non-adjacent positions. The imidazole compound may be a benzimidazole. Preferred compounds include thiabendazole, imazalil, carbendazim and prochloraz.

The 1,2,4-triazole compound incorporates a five-membered diunsaturated ring composed of three nitrogen atoms and two carbon atoms at non-adjacent positions.

Preferred triazole compounds include a triazole compound selected from compounds of formula (IV):

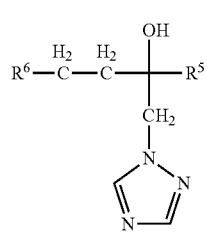

wherein $R^5$ represents a branched or straight chain $C_{1-5}$ alkyl group (e.g. t-butyl) and $R^6$ represents a phenyl group optionally substituted by one or more substituents selected from halogen (e.g. chlorine, fluorine or bromine) atoms or $C_{1-3}$ alkyl (e.g. methyl), $C_{1-3}$ alkoxy (e.g. methoxy), phenyl or nitro groups.

Alternatively, the triazole compound is advantageously selected from compounds of formula (V):

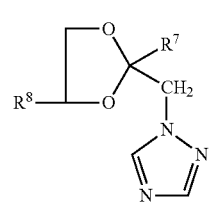

wherein $R^7$ is as defined for $R^6$ above and $R^8$ represents a hydrogen atom or a branched or straight chain $C_{1-5}$ alkyl group (e.g. n-propyl).

Particularly preferred triazoles include, but are not limited to, triadimefon, triadimenol, triazbutil, propiconazole, cyproconazole, difenoconazole, fluquinconazole, tebuconazole, flusilazole, uniconazole, diniconazole, bitertanol, hexaconazole, azaconazole, flutriafol, epoxyconazole, tetraconazole, penconazole, ipconazole, prothioconazole and mixtures thereof.

Even more preferred triazoles are propiconazole, azaconazole, hexaconazole, tebuconazole, cyproconazole, triadimefon, ipconazole, prothioconazole and mixtures thereof, preferably propiconazole, tebuconazole, cyproconazole and mixtures thereof, more preferably propiconazole, tebuconazole and mixtures thereof, with mixtures of propiconazole and tebuconazole being the most preferred.

In the most preferred embodiment, propiconazole and tebuconazole are used in mixture in a ratio of propiconazole:tebuconazole of 1:10 to 10:1, preferably 1:5 to 5:1 by weight. Particularly preferred ratios of propiconazole:tebuconazole are 1:1 to 5:1, such as about 3:1.

The formulations of the invention can comprise a fungicide which is not an organic fungicidal timber decay preservative. Suitable combinations of fungicides would be apparent to one skilled in the art and will vary according to the application. In particular, additional fungicides which extend the spectrum of activity of the formulation may be chosen, such as fungicides active against bluestain fungi, white rots, brown rots, dry rots and moulds. However, preferred formulations of the invention are free of biocidal metal ions, particularly free of copper.

The formulations may comprise one or more further active ingredients. A preferred active ingredient is an amine oxide. Suitable amine oxides that may be used in the formulations of the present invention are described in WO2007/135435. Preferred amine oxides include alkyldimethylamine oxides such as $C_{10}$ alkyldimethylamine oxide, $C_{10}$-$C_{14}$ alkyldimethylamine oxide, $C_{12}$-$C_{16}$ alkyldimethylamine oxide, $C_{16}$-$C_{18}$ alkyldimethylamine oxide, and mixtures thereof. Particularly preferred are $C_{12}$-$C_{14}$ alkyldimethylamine oxides, with $C_{12}$ alkyldimethylamine oxide being the most preferred.

In an alternative, but also preferred, class of formulations, amine oxide is not included in the formulation. Alternatively, if an amine oxide is present, it is not included in combination with either a betaine, a quaternary ammonium compound or a dimethyl alkyl amine.

In a preferred embodiment, the formulations of the invention do not contain any haloalkynyl compounds such as 3-iodo-2-propynyl-butyl-carbamate and the like.

The formulations according to the invention may additionally comprise other active ingredients such as termiticides, insecticides and/or bacteriocides.

Suitable insecticides would be apparent to the skilled man depending upon the intended application, and include, for example, chlorpyrifos, cypermethrin, fenvalerate, fenoxycarb, fipronil, farox, tetramethrin, isofenphos, permethrin, silafluofen, deltamethrin, bifenthrin, cyfluthrin, chlorfenapyr, thiachloprid, etofenprox, chlothianidin, thiamethoxam and imidacloprid, and benzoylureas such as lufenuron, hexaflumuron and flufenoxuron and in particular, flurox.

A particularly preferred insecticide is permethrin.

The formulations according to the invention may additionally comprise other components which may act to improve the characteristics of the wood treated with these biocides. Such compounds could include water repellents based on waxes, silicones and polysiloxanes, latex, fluorocarbon, organic carboxylate/metals, paper sizing agents or amine oxides, or combinations thereof; resins or crosslinking agents based on alkyds, acrylics, polyurethanes, formaldehydes, dimethylol, and epichlorohydrin or combinations thereof. Oils may also be used as may UV absorbers, corrosion inhibitors, penetrating aids including glycols, bactericides for example PHMB, colouring agents, antioxidants, metal chelators especially iron chelators, optical brightening agents, defoamers, pH buffers or other stabilisers. Preferred coadditives include PHMB and ethoxylated amines, such as those described in WO2007/026008. Ethoduomeen T/13® is a particularly preferred ethoxylated amine.

The inventors have shown that the efficacy of the formulations described is surprisingly greater than would be expected based on an additive effect. Therefore synergy is taking place. Thus, preferred formulations comprise, in synergistic proportions, an azole, an isothiazolone and an unsaturated carboxylic or sulphonic acid, salt or precursor thereof. Synergy may exist between any 2 of the components, preferably between all of them.

Particularly preferred formulations according to the present invention comprise an aromatic unsaturated carboxylic acid having formula (I); a triazole compound; and OIT, BIT, BBIT or CMIT; all as defined above.

Other particularly preferred formulations according to the present invention comprise benzoic acid (or sodium benzoate), oleic acid, abietic acid or salicyclic acid (or sodium salicyclate); a triazole compound; and OIT, BIT, BBIT or CMIT; all as defined above.

Still other particularly preferred formulations according to the present invention comprise benzoic acid (or sodium benzoate; a triazole compound; and OIT, BIT, BBIT or CMIT; all as defined above.

Especially preferred formulations according to the present invention comprise benzoic acid (or sodium benzoate) or sorbic acid (or potassium sorbate); a triazole compound; and OIT, BIT or BBIT; all as defined above.

Even more preferred are formulations comprising benzoic acid (or sodium benzoate); an azole; and OIT, such as for example formulations comprising sodium benzoate, propiconazole, tebuconazole, and OIT.

The concentration of the formulation required for preservative treatment depends on the nature and ratio of particular active agents selected, the method of treatment employed, the timber species, the level of protection required and the nature and quantity of any other biocides present. The amounts necessary can be determined readily by one skilled in the art.

In concentrate form the wood treatment composition will typically comprise as active ingredients 0.1-10%, preferably 0.2-5%, e.g. 0.2-2% w/w of azole; 0.02-10%, preferably 0.05-5%, e.g. 0.05-2% w/w isothiazolone; and 5-40%, preferably 10-30%, e.g. 15-30% w/w unsaturated acid. Other fungicidal organic timber decay preservatives may present in higher amounts than the above ranges of azoles. For example a wood treatment composition containing quaternary ammonium compounds as the fungicidal organic timber decay preservatives would typically comprise as active ingredients 0.1-25% w/w, preferably 3-12% w/w quaternary ammonium compound; 0.02-10%, preferably 0.05-5%, e.g. 0.05-2% w/w isothiazolone; and 5-40%, preferably 10-30%, e.g. 15-30% w/w unsaturated acid. These concentrates may contain only one or two of the above components such that the composition of the invention is formed by combining two or more concentrates, or alternatively a single concentrate may contain all three components.

Typically these concentrates will be diluted prior to application to the wood. Dilution will preferably be with water, e.g. at a ratio, water:concentrate v/v of 10:1 to 250:1 e.g. 20:1 to 100:1, to provide a treatment solution comprising typically 0.01-0.05%, e.g. 0.02-0.03% w/w azole such as a mixture of propiconazole and tebuconazole; 0.002-0.04%, e.g. 0.005-0.03% w/w isothiazolone such as OIT; and 0.1-1%, preferably 0.2-0.75%, e.g. 0.3-0.5% w/w unsaturated acid such as sodium benzoate. If other fungicidal organic timber decay preservatives are used, the amount present in the treatment solution may be different from the above levels specified for azoles. For example, quaternary ammonium compounds are typically present in the treatment solution at around 0.03-0.3% w/w.

Preferably, the total amount of isothiazolone present in the treatment solution of the invention is 500 ppm or less, more preferably 400 ppm or less, even more preferably 300 ppm or less, even more preferably 200 ppm or less. Most preferred are compositions that have a total amount of isothiazolone of 150 ppm or less. Preferably, the total amount of isothiazolone present in the treatment solution of the invention is at least 1 ppm, more preferably at least 5 ppm, more preferably at least 10 ppm, more preferably at least 15 ppm, more preferably at least 20 ppm, more preferably at least 25 ppm, most preferably at least 30 ppm.

Thus, the total amount of isothiazolone in the treatment solution of the invention is preferably 1 to 500 ppm, more preferably 5 to 400 ppm, even more preferably 5 to 300 ppm, even more preferably 5 to 200 ppm, even more preferably 5 to 150 ppm, even more preferably 10 to 150 ppm, even more preferably 20 to 150 ppm, with 30 to 150 ppm being particularly preferred.

Other preferred total amounts of isothiazolone in the treatment solution include from 10 to 300 ppm, preferably from 10 to 200 ppm, even more preferably from 15 to 150 ppm.

By "treatment solution" is meant the diluted form of the formulation of the invention which is actually applied to wood, and which contains the components of the formulation of the invention is suitable amounts to provide a wood preservative effect. Typically, the treatment solution of the invention is formed by diluting the formulation of the invention with water.

By "ppm" is meant "parts per million by weight". Thus, the total amount of isothiazolone present in the treatment solution of the invention is preferably 0.05 wt % or less, more preferably 0.04 wt % or less, even more preferably 0.03 wt % or less, even more preferably 0.02 wt % or less. Most preferred are treatment solutions that have a total amount of isothiazolone of 0.01 wt % or less. The formulations of the present invention typically contain levels of organic fungicidal timber decay preservative sufficient to provide sustained protection against wood decaying organisms. However, the levels of isothiazolone are typically much lower than those required to provide any significant surface stain protection. Despite this, the formulations of the present invention achieve surprisingly sustained protection against surface staining even though, at the concentrations present in the formulations of the invention, the individual ingredients show only limited effect against surface staining. It has been found that wood treated with the formulations of the invention can remain stain-free for 6 months or more, preferably 12 months or more.

The improved antisapstain performance achieved using the formulations of the present invention is particularly surprising, since the amount of isothiazolone in the formulations of the invention would not be expected to provide any prolonged protection against surface staining. Moreover, most organic fungicidal timber decay preservatives such as azoles alone are not known to provide significant protection against surface staining, even at the concentrations used in the formulations of the invention.

As noted above, particularly preferred formulations of the invention comprise an azole as the organic fungicidal timber decay preservative. In preferred embodiments the ratio between the azole and isothiazolone is at least 1:1, preferably at least 3:2, more preferably at least 2:1. Thus, preferred ratios between the azole and the isothiazolone include 50:1 to 1:100, more preferably 50:1 to 1:1, more preferably 30:1 to 5:4, more preferably 30:1 to 3:2, more preferably 25:1 to 2:1, and even more preferably 10:1 to 2:1 w/w.

As noted above, the inventors have recognised that low concentrations of isothiazolone, which on their own would provide minimal protection against surface staining, can be used to increase the surface stain protection provided by a wood treatment formulation containing an organic fungicidal timber decay preservative such as an azole and an unsaturated carboxylic or sulphonic acid, salt or precursor thereof. Thus, in a further aspect, the present invention provides the use of an isothiazolone for increasing the surface stain protection of wood provided by a wood preservative formulation comprising an unsaturated carboxylic or sulphonic acid, salt or precursor thereof and an organic fungicidal timber decay preservative such as an azole.

The present invention also provides the use of an isothiazolone for prolonging the surface stain protection of wood provided by a wood preservative formulation comprising an unsaturated carboxylic or sulphonic acid, salt or precursor thereof and an organic fungicidal timber decay preservative such as an azole.

The invention also provides the use of an isothiazolone in prolonging the surface stain protection of wood provided by a wood preservative formulation, wherein the isothiazolone is applied to the wood in a formulation at levels of 500 ppm or less, preferably 400 ppm or less, preferably from 5 to 300 ppm, more preferably from 5 to 200 ppm, even more preferably from 10 to 200 ppm, with levels of 30 to 150 ppm being the most preferred.

The invention also provides a wood preservative concentrate comprising an isothiazolone, an organic fungicidal timber decay preservative and an unsaturated carboxylic or sulphonic acid, salt or precursor thereof (preferably as defined above), wherein said wood preservative concentrate is suitable for dilution to a wood preservative treatment solution which contains less than 500 ppm isothiazolone.

Viewed in another way, the invention also provides a wood preservative formulation comprising an isothiazolone, an organic fungicidal timber decay preservative and an unsaturated carboxylic or sulphonic acid, salt or precursor thereof wherein the isothiazolone, organic fungicidal timber decay preservative and unsaturated carboxylic or sulphonic acid, salt or precursor thereof are present in amounts such that the formulation, when diluted with water, provides a wood preservative treatment solution which contains less than 500 ppm isothiazolone.

It is clear that in some instances it is preferable to formulate the formulation of the invention from two or three separate concentrated formulations shortly before administration. Thus, the formulation of the invention may be produced by mixing a formulation comprising, for example, an azole and an unsaturated acid together with a formulation comprising an isothiazolone, then diluting the resultant mixture prior to applying to a substrate. Preferably, the formulation of the invention may be formulated by mixing a composition containing an isothiazolone with a wood preservative composition comprising an azole and an unsaturated acid.

Thus, in a further aspect, the present invention provides a wood preservative kit comprising:

(i) a formulation comprising an organic fungicidal timber decay preservative and an unsaturated carboxylic or sulphonic acid, salt or precursor thereof; and (ii) a formulation comprising an isothiazolone.

The kits are for use in a method of wood preservation, preferably also a method of preventing surface staining of wood, such as sapstaining of wood. The kit will typically contain a first compartment or container containing formulation (i) and a second compartment or container containing formulation (ii).

The kit may be supplied with written instructions for mixing and diluting (in any order) the two formulations. Preferably, where instructions are provided, it is to provide a wood preservative treatment solution which contains less than 500 ppm of isothiazolone, e.g. 5 to 500 ppm, preferably 5 to 300 ppm, more preferably 10 to 200 ppm isothiazolone.

Alternatively viewed, the formulation in the kit are preferably suitable for the generation of a wood preservative treatment solution which contains less than 500 ppm isothiazolone.

Preferred embodiments of the formulations described above apply mutatis mutandis to these kits.

In a further aspect, the invention provides a method of preserving wood or other cellulosic substrates which comprises applying to the wood or other cellulosic substrate a formulation of the invention as described above or applying the individual components to the wood/substrate such that the wood/substrate effectively receives a formulation as described. Preferably, the invention provides a method of preventing sapstain formation on wood or other cellulosic material which comprises applying to the wood or other cellulosic substrate a formulation of the invention as described above or applying the individual components to the wood/substrate such that the wood/substrate effectively receives a formulation as described.

Reference to "individual components is not to be understood as requiring separate application of each active ingredient but as indicating that the whole complement of active and other ingredients are not simultaneously applied. Thus, the substrate is treated in such a way which means that it effectively receives a wood preservative formulation of the invention.

Thus, the invention also provides a method of maintaining the visual appearance of wood or other substrates which comprises applying to the wood or other cellulosic substrate a formulation of the invention as described above or applying the individual components to the wood/substrate such that the wood/substrate effectively receives a formulation as described. Methods of assessing the visual appearance of wood are known in the art, and are described for example in WO2009/133374 as well as in Example 3 below.

Types of wood which can benefit from treatment with the formulations of the invention include sawn timber, logs, glulam, plywood, laminated veneer lumber, wood based composite products such as oriented strandboard, medium density fibreboard, fibreboard, hardboard and particle board.

It will be understood that "wood" in the context of this invention does not encompass living trees or other plants.

Other materials which can benefit from treatment with the formulations of the invention are lignocellulosic substrates, wood plastic composites, cardboard and cardboard faced building products such as plasterboard, and cellulosic material such as cotton. Also, leather, textile materials and even synthetic fibres, hessian, rope and cordage as well as composite wood materials. For convenience, the invention is described with reference to the treatment of wood but it will be appreciated that other materials may be treated analogously. The reference to treatment of "wood" applies mutatis mutandis to such substrates, unless it is clear from the context. Preferably, though not exclusively, the formulations are applied to sawn timber, logs or laminated veneer lumber. Most preferably, the formulations are applied to unseasoned timber.

Conveniently, the formulations of the present invention are applied as a liquid composition. They may also be applied as a solid implant or paste. Preferably, the formulations are applied as a liquid composition, e.g. in the form of an emulsion made up of solubilised liquid droplets. These emulsions do not contain any biocides in a solid, particulate form. Preferably, the emulsions are in the form of a microemulsion. The person skilled in the art of making emulsions knows how to make an emulsion according to the invention by the use of suitable solvents and emulsifying agents.

Preferably, when applied in liquid form, this is in an aqueous solution, but one or more organic solvents or a mixture of water and an organic solvent could also be used. Suitable organic solvents include both aromatic and aliphatic hydrocarbon solvents such as white spirit, petroleum distillate, kerosene, diesel oils and naphthas. Also, glycol ethers, benzyl alcohol, 2-phenoxy ethanol, methyl carbitol, propylene carbonate, benzyl benzoate, ethyl lactate and 2-ethyl hexyl lactate.

The application of these formulations may be by one or more of dipping, deluging, spraying, brushing or other surface coating means or by impregnation methods, e.g. high pressure or double vacuum impregnation into the body of the wood or other material, all being techniques well known to the man skilled in the art. Impregnation under pressure is particularly advantageous when the substrate is wood or a wood composite material which is made to become wet during its life, for example, wood for window frames, timber used above ground in exposed environments such as decking and timber used in ground contact or fresh water or salt water environments.

Substrates made of wood or cellulosic material which have been treated with a formulation or by a method according to the invention as described herein, comprise further aspects of the present invention. Additionally, substrates made of wood or other cellulosic material comprising a formulation according to the invention comprise a further aspect of the present invention.

A further aspect of the present invention is the use of formulations of the present invention in the treatment or preservation of wood or other cellulosic substrates. Preferably, the invention provides the use of formulations of the present invention in the prevention of in-service surface staining, particularly in the prevention of in-service surface staining for timber in EN335 class 3 environments.

Preferably, the formulations are applied to timber components before they are used but they can also be used remedially as a curative action in preventing continued wood defacement.

In yet a further aspect, the invention provides a method of making a wood preservative formulation which comprises admixing an isothiazolone, a organic fungicidal timber decay preservative, and an unsaturated carboxylic or sulphonic acid, salt or precursor thereof. Preferred embodiments discussed above in relation to other aspects of the invention apply mutatis mutandis and thus the above three components may be further combined with one or more of an amine oxide etc.

The invention will be further described with reference to the following non-limiting Examples and Figures in which:

EXAMPLES

Example 1

Figure 1:
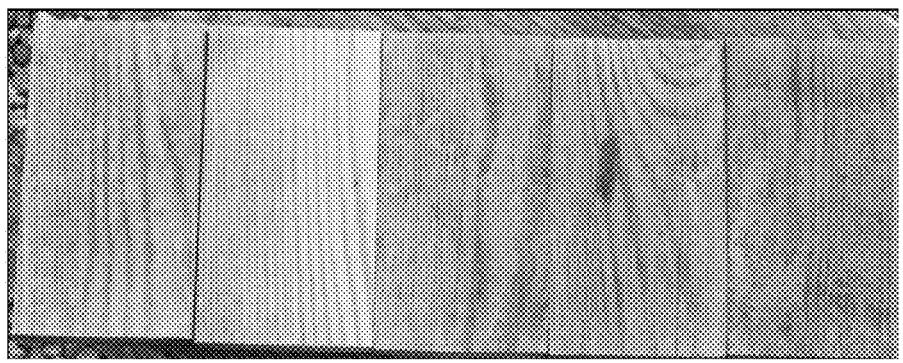
FIG. 1 is a photograph of untreated wood after exposure for 25 weeks, according to Example 1.

A field trial was initiated in which a number of formulations were tested for their ability to prolong the period which timber could be maintained in a stain and mould free condition.

The formulations were prepared by adding all of the water insoluble ingredients (e.g. azoles, isothiazolone, any insoluble acids etc.) to the solvent (Dowanol DPM®) and stirring until fully dissolved. The surfactant was then stirred in and water added. Any water soluble additives (e.g. sodium benzoate) were added last.

"a.i." as used in these examples is active ingredient.

The following products were used for each of the active ingredients:

| | |
|---|---|
| Preventol A8 ® | (95% a.i. tebuconazole) |
| Wocosen 50TK ® | (50% a.i. propiconazole) |
| Vanquish 100 ® | (99% a.i. BBIT) |
| Acticide 45 ® | (45% a.i. OIT) |
| Acticide B20 ® | (20% a.i. BIT) |

The formulations used in the test were as follows (all values are given in % w/w):

Formulation I-1 (Comparative)

| | |
|---|---|
| Tebuconazole (95% a.i.) | 1.5 |
| Surfactant | 11.25 |
| Solvent | 8.8 |
| Water | 78.45 |

Formulation I-2 (Comparative)

| | |
|---|---|
| Propiconazole (50% a.i.) | 3 |
| Surfactant | 11.25 |
| Solvent | 8.8 |
| Water | 76.95 |

Formulation I-3 (Comparative)

| | |
|---|---|
| Tebuconazole (95% a.i.) | 1 |
| Propiconazole (50% a.i.) | 1 |
| Surfactant | 11.25 |
| Solvent | 8.8 |
| Water | 77.95 |

Formulation I-4 (Comparative)

| | |
|---|---|
| Tebuconazole (95% a.i.) | 1.5 |
| Surfactant | 11.25 |
| Solvent | 8.8 |
| Sodium benzoate | 22.5 |
| Water | 55.95 |

Formulation I-5 (Comparative)

| | |
|---|---|
| Propiconazole (50% a.i.) | 3 |
| Surfactant | 11.25 |
| Solvent | 8.8 |
| Sodium Benzoate | 22.5 |
| Water | 54.45 |

Formulation I-6 (Comparative)

| | |
|---|---|
| Tebuconazole (95% a.i.) | 1 |
| Propiconazole (50% a.i.) | 1 |
| Surfactant | 11.25 |
| Solvent | 8.8 |
| Sodium benzoate | 22.5 |
| Water | 55.45 |

Formulation I-7 (Comparative)

| | |
|---|---|
| BBIT (99% a.i.) | 1.25 |
| Dowanol DPM ® | 8.99 |
| Dehscofix CO120F ® | 11.23 |
| Water | 77.04 |
| EDTA | 1.5 |

Diluted to be equivalent to 100 ppm BBIT when applied to wood.

Formulation I-8 (Comparative)

| | |
|---|---|
| BBIT (99% a.i.) | 1.21 |
| Tebuconazole (95% a.i.) | 0.97 |
| Propiconazole (50% a.i.) | 1.01 |
| Dowanol DPM ® | 8.69 |
| Dehscofix CO120F ® | 10.86 |
| Water | 75.81 |
| EDTA | 1.45 |

Diluted to be equivalent to 100 ppm BBIT when applied to wood.

Formulation I-9 (Comparative)

| | |
|---|---|
| BBIT (99% a.i.) | 1.19 |
| Dowanol DPM ® | 8.97 |
| Dehscofix CO120F ® | 11.21 |
| Water | 54.56 |
| Sodium Benzoate | 22.57 |
| EDTA | 1.5 |

Diluted to be equivalent to 100 ppm BBIT when applied to wood.

Formulation I-10

| | |
|---|---|
| BBIT (99% a.i.) | 1.19 |
| Tebuconazole (95% a.i.) | 1 |
| Propiconazole (50% a.i.) | 1 |
| Dowanol DPM ® | 8.69 |
| Dehscofix CO120F ® | 12.64 |
| Water | 50.8 |
| Sodium Benzoate | 22.94 |
| EDTA | 1.49 |

Diluted to be equivalent to 100 ppm BBIT when applied to wood.

Formulation I-11 (Comparative)

| | |
|---|---|
| BIT (20% a.i.) | 5.99 |
| Dowanol DPM ® | 8.99 |
| Dehscofix CO120F ® | 11.29 |
| Water | 72.23 |
| EDTA | 1.5 |

Diluted to be equivalent to 100 ppm BIT when applied to wood.
Formulation I-12 (Comparative)

| | |
|---|---|
| BIT (20% a.i.) | 5.86 |
| Tebuconazole (95% a.i.) | 0.98 |
| Propiconazole (50% a.i.) | 0.98 |
| Dowanol DPM ® | 8.79 |
| Dehscofix CO120F ® | 10.98 |
| Water | 70.81 |
| EDTA | 1.61 |

Diluted to be equivalent to 100 ppm BIT when applied to wood.
Formulation I-13 (Comparative)

| | |
|---|---|
| BIT (20% a.i.) | 5.98 |
| Dowanol DPM ® | 9.07 |
| Dehscofix CO120F ® | 11.22 |
| Sodium benzoate | 22.57 |
| Water | 49.61 |
| EDTA | 1.5 |

Diluted to be equivalent to 100 ppm BIT when applied to wood.
Formulation I-14

| | |
|---|---|
| BIT (20% a.i.) | 5.97 |
| Tebuconazole (95% a.i.) | 0.99 |
| Propiconazole (50% a.i.) | 1.01 |
| Dowanol DPM ® | 8.97 |
| Dehscofix CO120F ® | 11.22 |
| Sodium benzoate | 7.46 |
| Water | 47.55 |
| EDTA | 1.56 |

Diluted to be equivalent to 100 ppm BIT when applied to wood.
Formulation I-15 (Comparative)

| | |
|---|---|
| OIT (45% a.i.) | 0.79 |
| Dowanol DPM ® | 8.84 |
| Dehscofix CO120F ® | 11.05 |
| Water | 77.65 |
| EDTA | 1.67 |

Diluted to be equivalent to 30 ppm OIT when applied to wood.
Formulation I-16

| | |
|---|---|
| OIT (45% a.i.) | 0.80 |
| Tebuconazole (95% a.i.) | 1 |
| Propiconazole (50% a.i.) | 1 |
| Dowanol DPW ® | 9.04 |
| Dehscofix CO120F ® | 11.24 |
| Water | 52.94 |
| Sodium benzonate | 22.48 |
| EDTA | 1.5 |

Diluted to be equivalent to 30 ppm OIT when applied to wood.
Formulation I-17 (Comparative)

| | |
|---|---|
| BBIT (99% a.i.) | 3.6 |
| Dowanol DPM ® | 9.01 |
| Dehscofix CO120F ® | 11.24 |
| Water | 74.63 |
| EDTA | 1.52 |

Diluted to be equivalent to 300 ppm BBIT when applied to wood.
Formulation I-18

| | |
|---|---|
| BBIT (99% a.i.) | 3.59 |
| Tebuconazole (95% a.i.) | 1.02 |
| Propiconazole (50% a.i.) | 1.02 |
| Dowanol DPM ® | 9.05 |
| Dehscofix CO120F ® | 11.22 |
| Sodium benzoate | 22.45 |
| Water | 50.14 |
| EDTA | 1.50 |

Diluted to be equivalent to 300 ppm BBIT when applied to wood.
Formulation I-19 (Comparative)

| | |
|---|---|
| BIT (20% a.i.) | 17.98 |
| Dowanol DPM ® | 8.99 |
| Dehscofix CO120F ® | 11.24 |
| Water | 60.24 |
| EDTA | 1.55 |

Equivalent to 300 ppm BIT when applied to wood
Formulation I-20

| | |
|---|---|
| BIT (20% a.i.) | 18.18 |
| Tebuconazole (95% a.i.) | 1.01 |
| Dowanol DPM ® | 9.16 |
| Dehscofix CO120F ® | 11.38 |
| Sodium benzoate | 22.71 |
| Water | 36.05 |
| EDTA | 1.51 |

Equivalent to 300 ppm BIT when applied to wood

The test formulations were evaluated using planed timber blocks of dimension 135×70×25 mm which were machined from Scots Pine (*Pinus sylvestris*). The upper face of each block consisted entirely of sapwood. Five duplicate blocks were treated with each of the formulations.

For exposure, the blocks were mounted horizontally on untreated pine racks at ground lavel on a gravel surface for natural weathering conditions.

After 25 weeks exposure, the samples were inspected to determine the extent of surface staining and mould growth.

For comparison, a further set of five untreated timber blocks were also subjected to 25 weeks exposure. The untreated blocks showed considerable mould growth and surface staining, as shown in FIG. 1.

Figure 2:
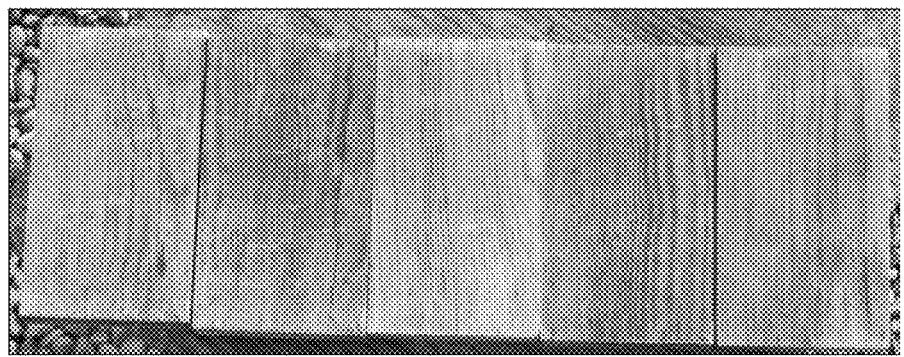
FIG. 2 is a photograph of wood treated with formulation I-1 after exposure for 25 weeks.
Figure 3:
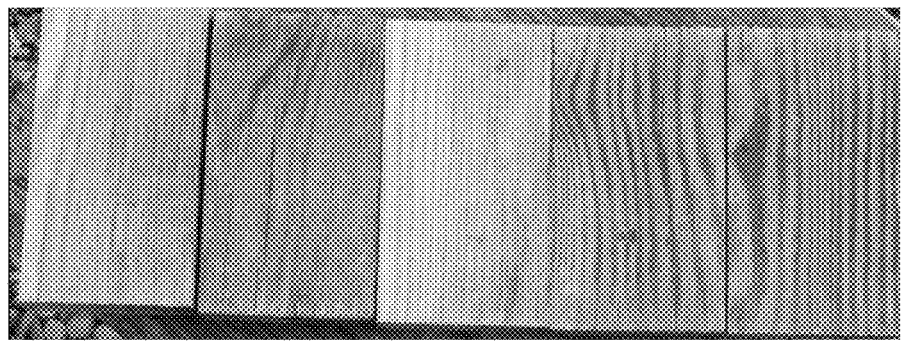
FIG. 3 is a photograph of wood treated with formulation I-2 after exposure for 25 weeks.
Figure 4:
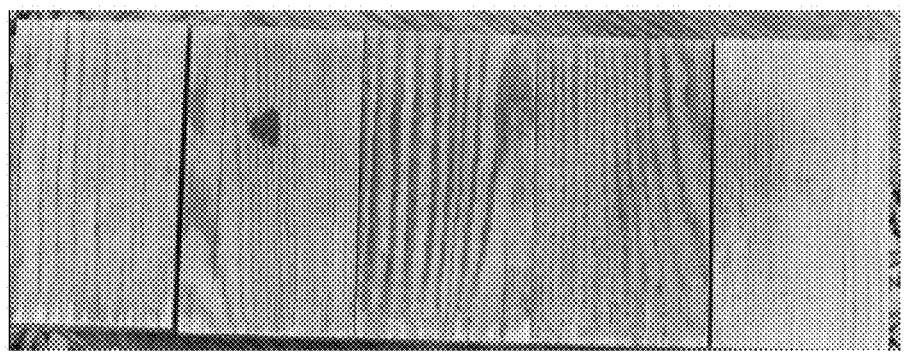
FIG. 4 is a photograph of wood treated with formulation I-3 after exposure for 25 weeks.

The blocks treated with formulations 1, 2 and 3 are shown in FIGS. 2, 3 and 4 respectively. As can be seen, the inclusion of azoles has little effect on the amount of surface staining. Furthermore, the combination of tebuconazole and propiconazole showed no discernable improvement over the use of either azole alone.

Figure 5:
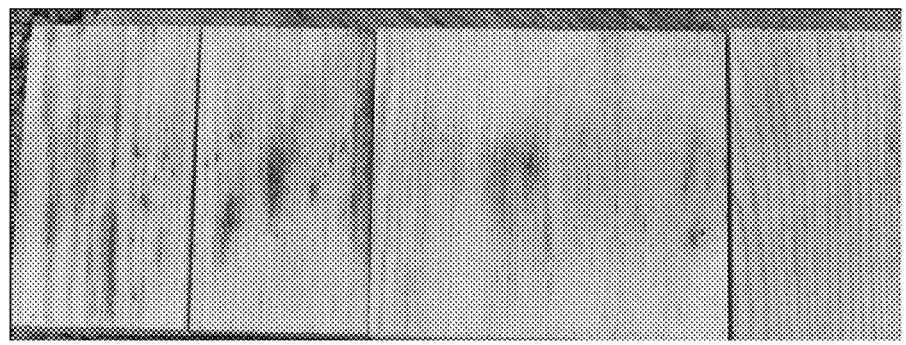
FIG. 5 is a photograph of wood treated with formulation I-4 after exposure for 25 weeks.
Figure 6:
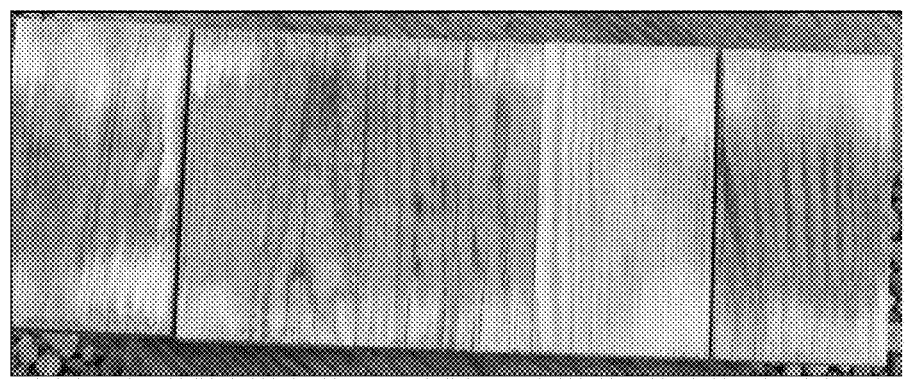
FIG. 6 is a photograph of wood treated with formulation I-5 after exposure for 25 weeks.
Figure 7:
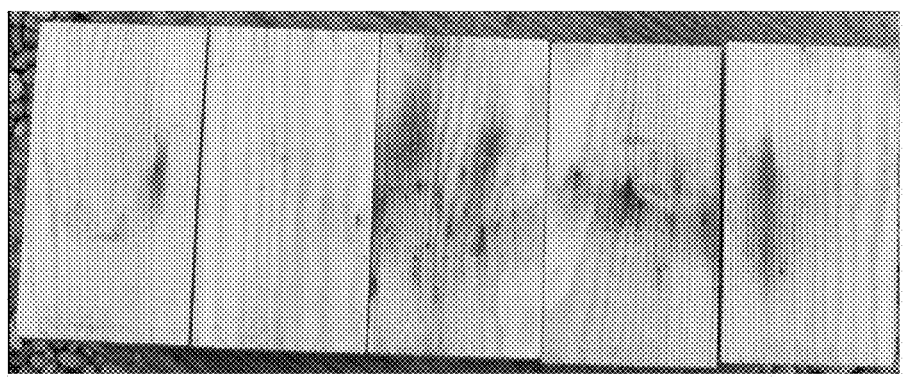
FIG. 7 is a photograph of wood treated with formulation I-6 after exposure for 25 weeks.

The blocks treated with formulations 4, 5 and 6 are shown in FIGS. 5, 6 and 7 respectively. These Figures show that the combination of sodium benzoate with an azole does show significantly improved protection against surface staining. Moreover, the difference between propiconazole and tebuconazole either alone or in combination is more evident. However, each of formulations 4, 5 and 6 fail to provide acceptable protection against surface staining.

Figure 8A:
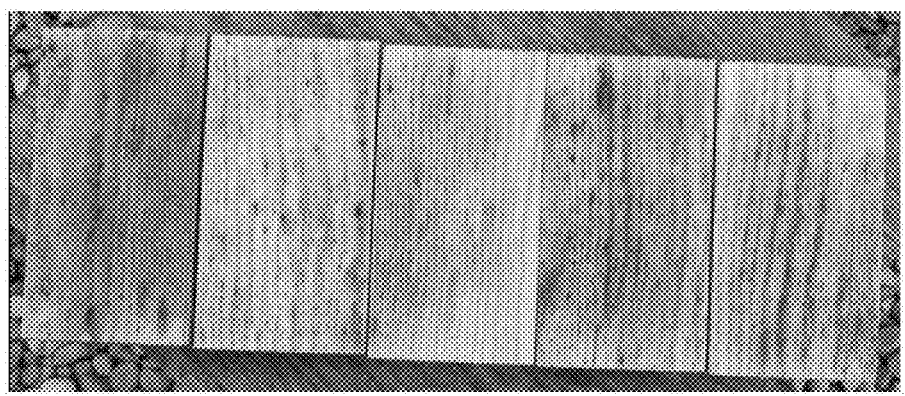
FIG. 8a is a photograph of wood treated with formulation I-7 after exposure for 25 weeks.
Figure 8B:
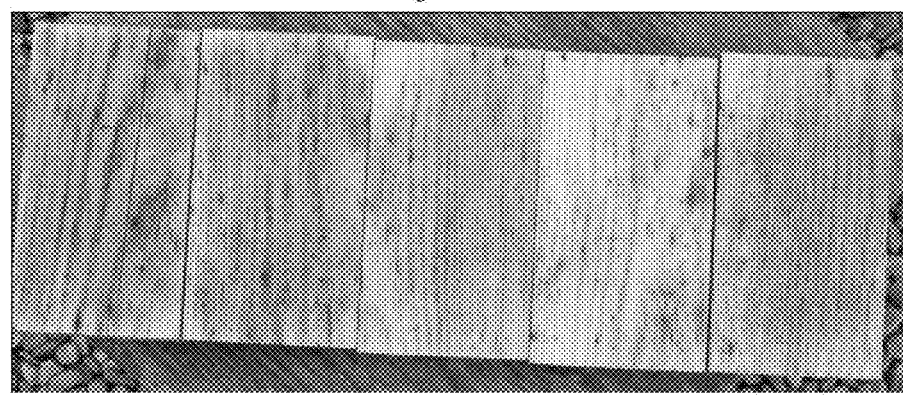
FIG. 8b is a photograph of wood treated with formulation I-8 after exposure for 25 weeks.
Figure 8C:
FIG. 8c is a photograph of wood treated with formulation I-9 after exposure for 25 weeks.
Figure 8D:
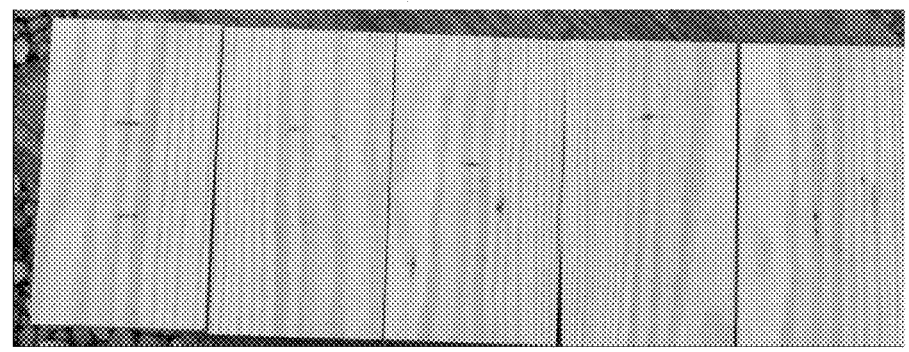
FIG. 8d is a photograph of wood treated with formulation I-10 after exposure for 25 weeks.

The blocks treated with formulations 7, 8, 9 and 10 are shown in FIGS. 8a, 8b, 8c and 8d respectively. FIGS. 8a and 8b demonstrate that blocks treated with a formulation containing only an isothiazolone (BBIT) show similar surface staining to blocks treated with a formulation comprising an isothiazolone and an azole. Therefore, the azole does not markedly improve the performance of the isothiazolone. FIG. 8c shows that the combination of BBIT and sodium benzoate does show significant improvement in protection against surface staining. However, the blocks in FIG. 8c are beginning to show the first signs of significant surface staining. In contrast, the blocks treated with the three way combination of BBIT, sodium benzoate and an azole according to the invention show no visible surface staining (see FIG. 8d).

Figure 9A:
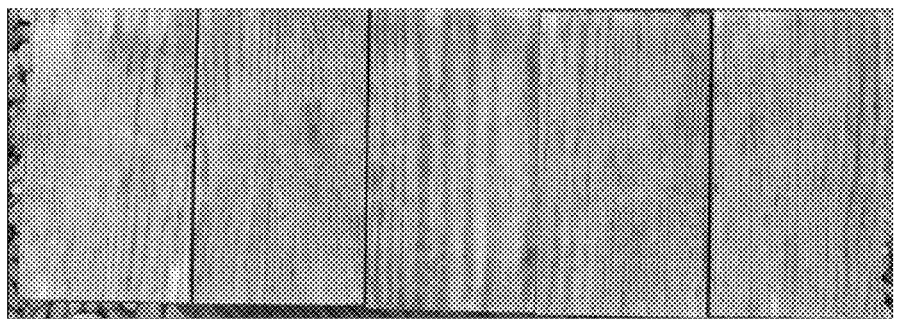
FIG. 9a is a photograph of wood treated with formulation I-11 after exposure for 25 weeks.
Figure 9B:
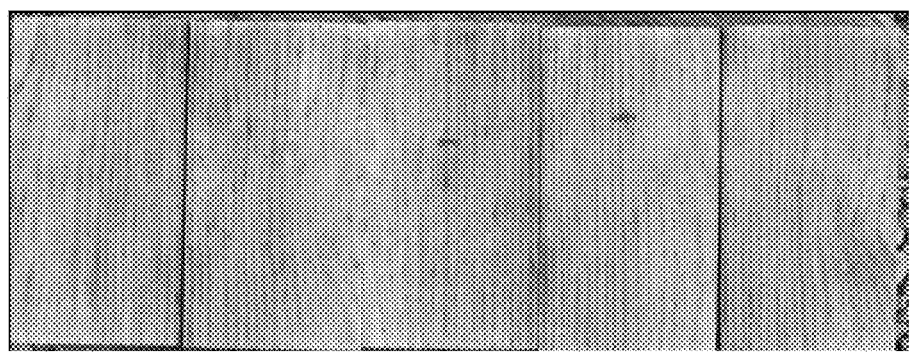
FIG. 9b is a photograph of wood treated with formulation I-12 after exposure for 25 weeks.
Figure 9C:
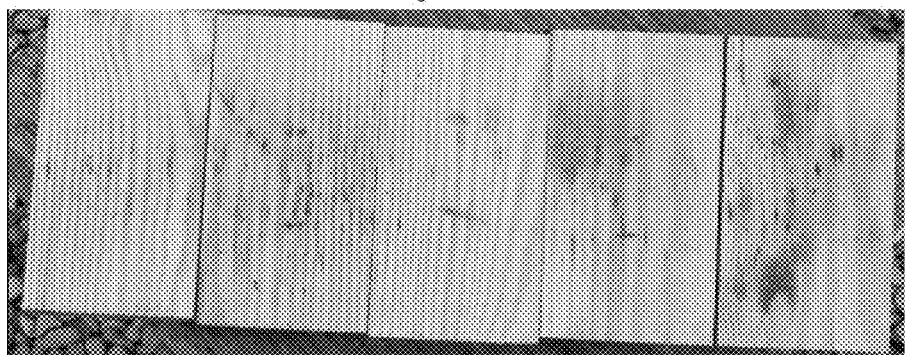
FIG. 9c is a photograph of wood treated with formulation I-13 after exposure for 25 weeks.
Figure 9D:
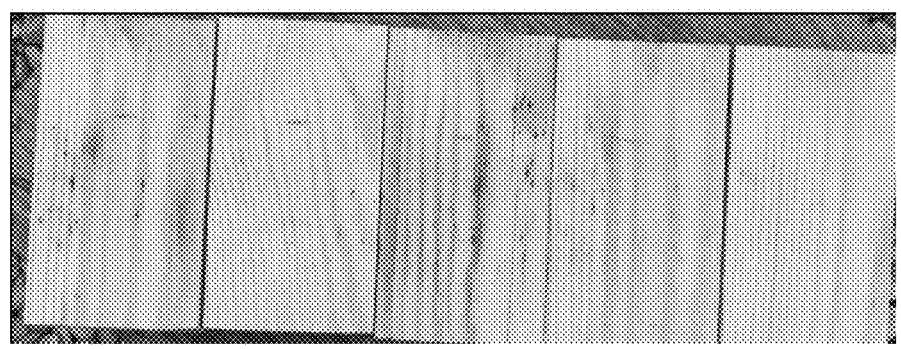
FIG. 9d is a photograph of wood treated with formulation I-14 after exposure for 25 weeks.
Figure 10A:
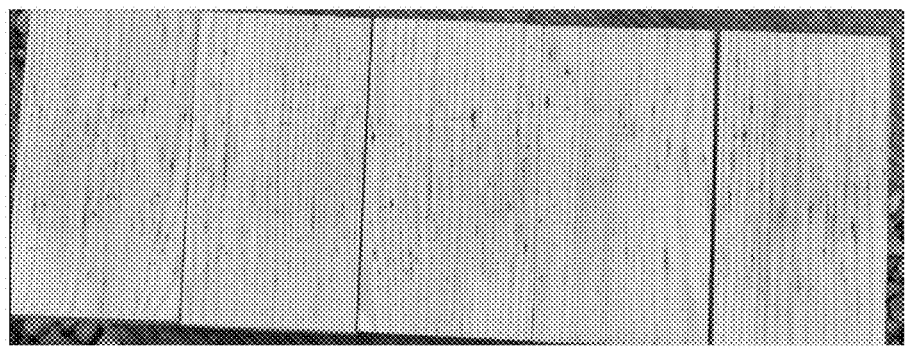
FIG. 10a is a photograph of wood treated with formulation I-15 after exposure for 25 weeks.
Figure 10B:
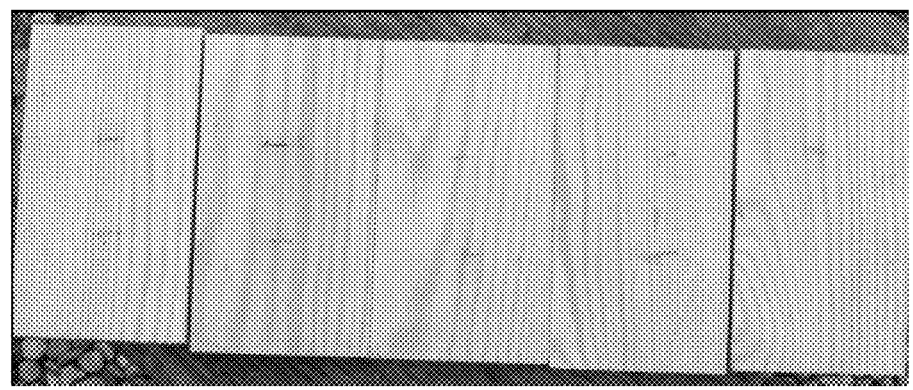
FIG. 10b is a photograph of wood treated with formulation I-16 after exposure for 25 weeks.
Figure 11A:
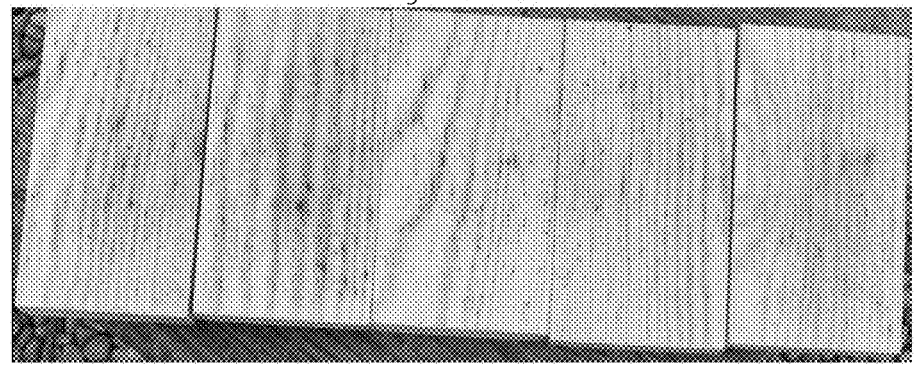
FIG. 11a is a photograph of wood treated with formulation I-17 after exposure for 25 weeks.
Figure 11B:
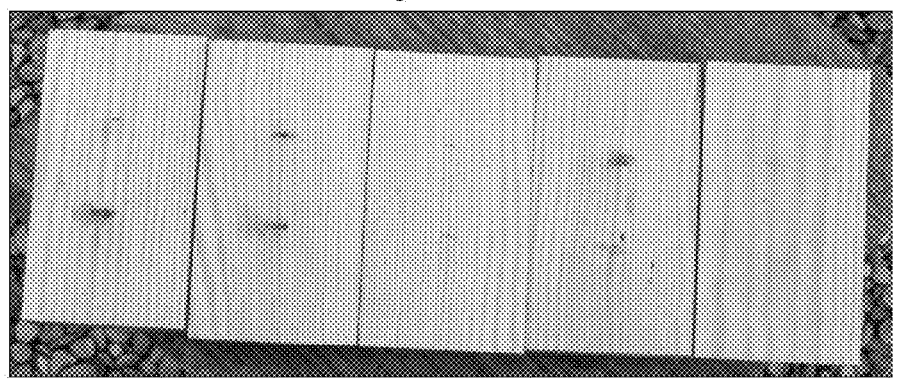
FIG. 11b is a photograph of wood treated with formulation I-18 after exposure for 25 weeks.
Figure 12A:
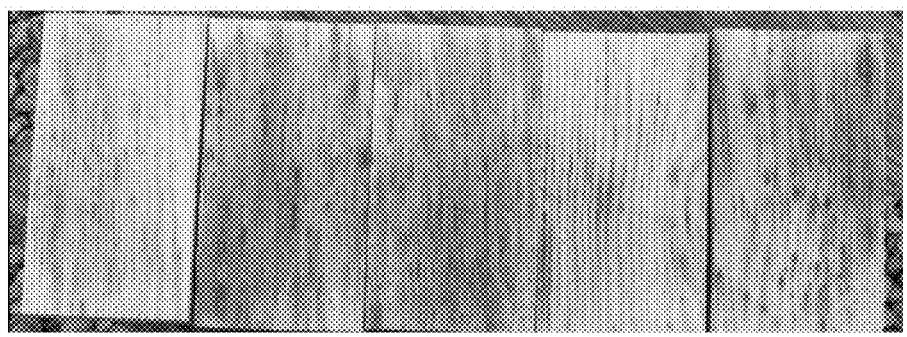
FIG. 12a is a photograph of wood treated with formulation I-19 after exposure for 25 weeks.
Figure 12B:
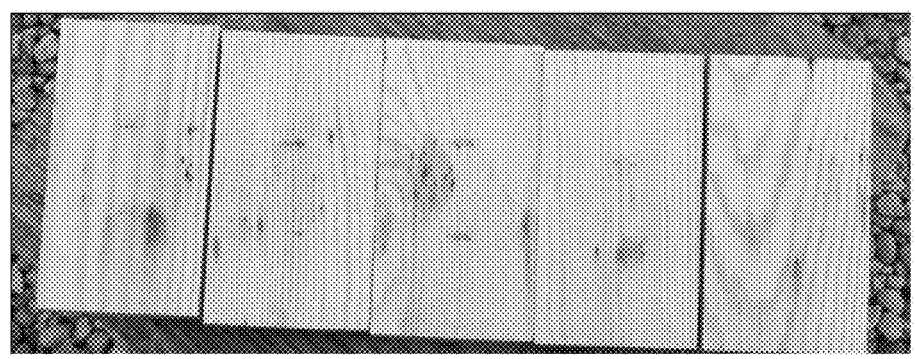
FIG. 12b is a photograph of wood treated with formulation I-20 after exposure for 25 weeks.
Figure 13:
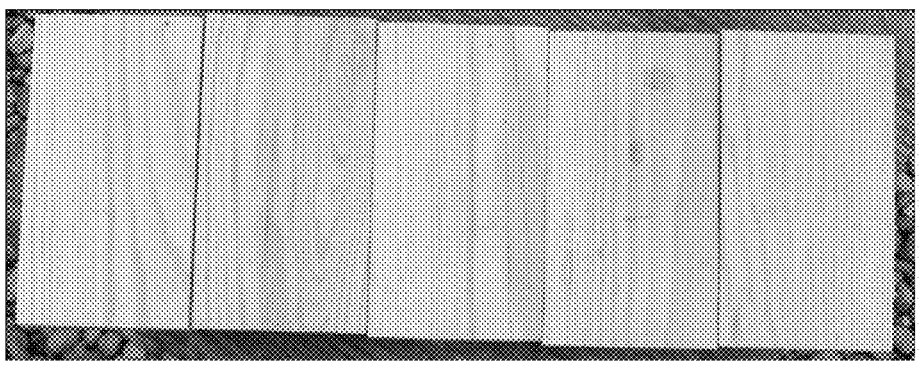
FIG. 13 is a photograph of wood treated with formulation II-1 after exposure for 25 weeks.
Figure 14:
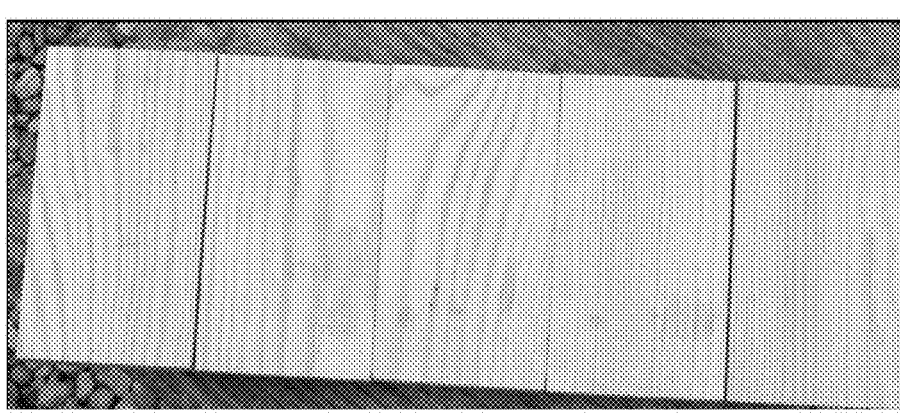
FIG. 14 is a photograph of wood treated with formulation II-2 after exposure for 25 weeks.
Figure 15:
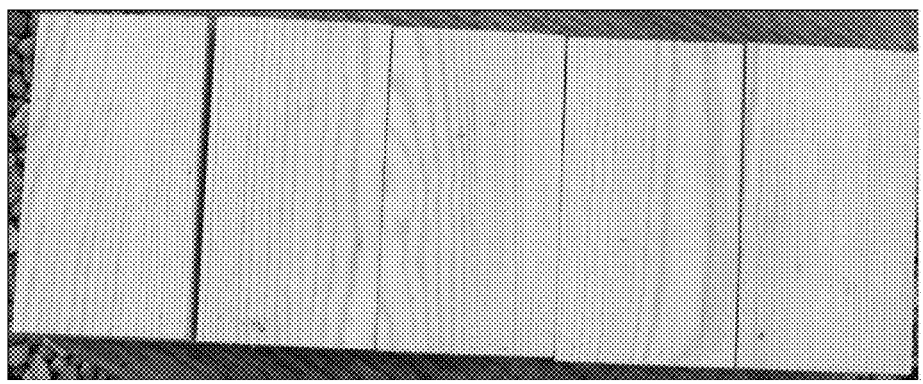
FIG. 15 is a photograph of wood treated with formulation II-3 after exposure for 25 weeks.
Figure 16:
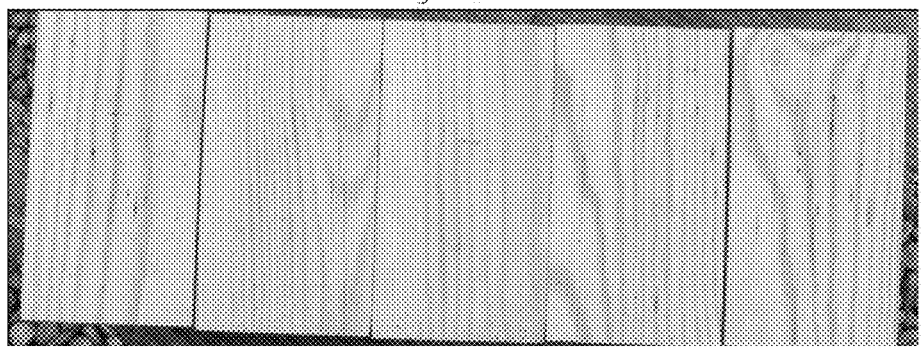
FIG. 16 is a photograph of wood treated with formulation II-4 after exposure for 25 weeks.
Figure 17:
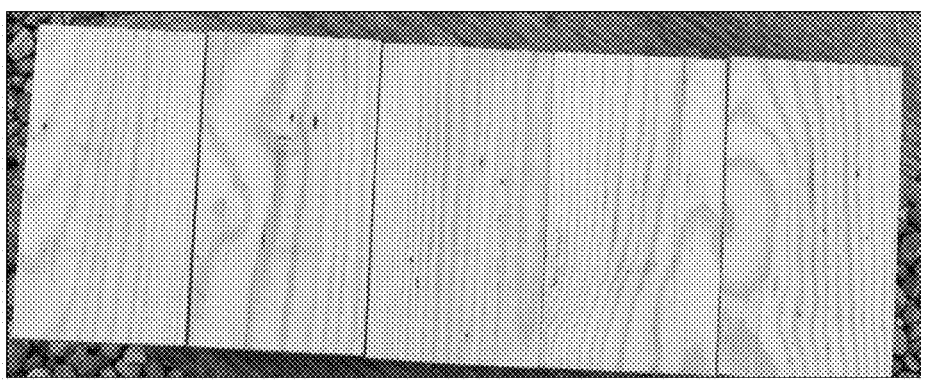
FIG. 17 is a photograph of wood treated with formulation II-5 after exposure for 25 weeks.
Figure 18:
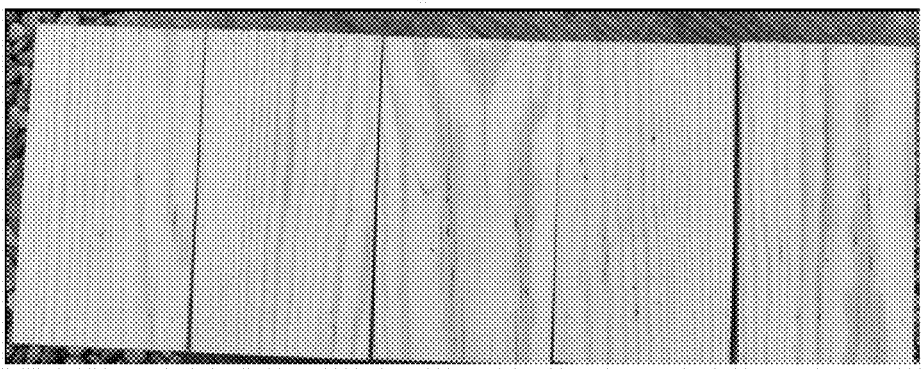
FIG. 18 is a photograph of wood treated with formulation II-6 after exposure for 25 weeks.

The blocks treated with formulations 11, 12, 13 and 14 are shown in FIGS. 9a, 9b, 9c and 9d respectively. These Figures show a similar trend to FIGS. 8a, 8b, 8c and 8d, in that the azole/BIT combination shows little improvement over BIT alone, while BIT/sodium benzoate does show an improvement. However, the most effective formulation is clearly the three way combination of BIT, sodium benzoate and an azole, as shown in FIG. 9d.

The blocks treated with formulations 15, 16, 17, 18, 19 and 20 are shown in FIGS. 10a, 10b, 11a, 11b, 12a and 12b respectively. These figures clearly show that the combination of isothiazolone with azole and sodium benzoate display significantly better protection against surface stain than the use of either isothiazolone alone, or sodium benzoate and azole in combination (see FIGS. 5 and 7).

Example 2

The following formulations were formulated and tested using the same protocols as described in Example 1.

Formulation II-1

| | |
|---|---|
| OIT (45% a.i.) | 2.65 |
| Tebuconazole (95% a.i.) | 1.49 |
| Dowanol DPM ® | 9.10 |
| Dehscofix CO120F ® | 11.17 |
| Water | 51.28 |
| Sodium benzonate | 22.59 |
| EDTA | 1.72 |

Diluted to be equivalent to 100 ppm OIT when applied to wood.

Formulation II-2

| | |
|---|---|
| OIT (45% a.i.) | 2.65 |
| Propiconazole (50% a.i.) | 3.13 |
| Dowanol DPM ® | 8.98 |
| Dehscofix CO120F ® | 11.23 |
| Water | 49.97 |
| Sodium benzonate | 22.47 |
| EDTA | 1.56 |

Diluted to be equivalent to 100 ppm OIT when applied to wood.

Formulation II-3

| | |
|---|---|
| OIT (45% a.i.) | 2.67 |
| Triadimefon | 1.50 |
| Dowanol DPM ® | 17.99 |
| Dehscofix CO120F ® | 17.46 |
| Water | 36.44 |
| Sodium benzonate | 22.43 |
| EDTA | 1.52 |

Diluted to be equivalent to 100 ppm OIT when applied to wood.

Formulation II-4

| | |
|---|---|
| OIT (45% a.i.) | 2.66 |
| Tebuconazole (95% a.i.) | 1 |
| Propiconazole (50% a.i.) | 1 |
| Dowanol DPM ® | 8.99 |
| Dehscofix CO120F ® | 11.24 |
| Water | 73.53 |
| EDTA | 1.58 |

Diluted to be equivalent to 100 ppm OIT, then combined with 0.03 w/w abietic acid and applied to wood.

Formulation II-5

| | |
|---|---|
| OIT (45% a.i.) | 2.66 |
| Tebuconazole (95% a.i.) | 1 |
| Propiconazole (50% a.i.) | 1 |
| Dowanol DPW ® | 8.99 |
| Dehscofix CO120F ® | 11.24 |
| Water | 73.53 |
| EDTA | 1.58 |

Diluted to be equivalent to 100 ppm OIT, then combined with 0.03 w/w sodium salicyclate and applied to wood.

Formulation II-6

| | |
|---|---|
| OIT (45% a.i.) | 2.66 |
| Tebuconazole (95% a.i.) | 1 |
| Propiconazole (50% a.i.) | 1 |
| Dowanol DPM ® | 8.99 |
| Dehscofix CO120F ® | 11.24 |
| Water | 73.53 |
| EDTA | 1.58 |

Diluted to be equivalent to 100 ppm OIT, then combined with 0.03 w/w oleic acid and applied to wood.

Photographs of wood treated with formulations II-1 to II-6 after 25 weeks' exposure are shown in FIGS. 13 to 18 respectively. From these figures, it is clear that each of the formulations displays excellent protection against surface staining.

Example 3

Sections of pine sideboard were cut into 134×68×20 mm blocks which were then treated with wood preservative treatment solutions. The formulations were applied to the blocks by 45 minute wet vacuum in the treatment solution at 80 kPa (600 mmHg) followed by an hour at 1.2 MPa (12 bar) pressure. The blocks were treated with an average retention target of 650 kg/m$^3$, The following products were used for each of the active ingredients:

| | |
|---|---|
| Acticide DT ® | (10-25% a.i. DCOIT) |
| Acticide RS ® | (10-25% a.i. CMIT) |
| Acticide 45 ® | (45% a.i. OIT) |
| Preventol A8 ® | (95% a.i. tebuconazole) |
| Wocosen 50TK ® | (50 a.i propiconazole) |
| Evipol ® | (94% a.i. cyproconazole) |
| Corbel ® | (79.5% a.i. fenpropimorph) |
| Carboquat 250T ® | (50% a.i. didecyldimethyl ammonium chloride) |

The formulations used in the test were as follows (all values are given in % w/w):

Formulation III-1-1 (Comparative)

| | |
|---|---|
| Oleic acid | 15.00 |
| 30% NaOH solution | 7.08 |
| Dowanol DPM | 9.00 |
| Dehscofix CO130F | 11.25 |
| Dissolvine E39 | 1.50 |
| Foamban 2901 | 0.08 |
| Water | 56.10 |

This concentrate was then diluted down to 0.45% with water.

Formulation III-1-2 (Comparative)

| | |
|---|---|
| Sodium salicylate | 10.00 |
| 30% NaOH solution | 8.33 |
| Dowanol DPM | 9.00 |
| Dehscofix CO130F | 11.25 |
| Dissolvine E39 | 1.50 |
| Foamban 2901 | 0.08 |
| Water | 59.84 |

This concentrate was then diluted down to 0.45% with water.

Formulation III-1-3 (Comparative)

| | |
|---|---|
| Sodium dodecyl benzene sulfonate | 20.00 |
| Dowanol DPM | 9.00 |
| Dehscofix CO130F | 11.25 |
| Dissolvine E39 | 1.50 |
| Foamban 2901 | 0.08 |
| Water | 58.18 |

This concentrate was then diluted down to 0.45% with water.

Formulation III-1-4 (Comparative)

| | |
|---|---|
| Abietic acid | 10.00 |
| 30% NaOH solution | 4.41 |
| Dowanol DPM | 9.00 |
| Dehscofix CO130F | 11.25 |
| Dissolvine E39 | 1.50 |
| Foamban 2901 | 0.08 |
| Water | 63.76 |

This concentrate was then diluted down to 0.45% with water.

Formulation III-1-5 (Comparative)

| | |
|---|---|
| Sodium benzoate | 20.00 |
| Dowanol DPM | 9.00 |
| Dehscofix CO130F | 11.25 |
| Dissolvine E39 | 1.50 |
| Foamban 2901 | 0.075 |
| Water | 58.18 |

This concentrate was then diluted down to 0.45% with water.

Formulation III-1-6 (Comparative)

| | |
|---|---|
| Sodium acetate | 11.38 |
| Dowanol DPM | 9.00 |
| Dehscofix CO130F | 11.25 |
| Dissolvine E39 | 1.50 |
| Foamban 2901 | 0.08 |
| Water | 66.79 |

This concentrate was then diluted down to 0.45% with water.

Formulation III-1-7 (Comparative)

| | |
|---|---|
| Methyl benzoate | 18.90 |
| 30% NaOH solution | 18.51 |
| Dowanol DPM | 9.00 |
| Dehscofix CO130F | 11.25 |
| Dissolvine E39 | 1.50 |
| Foamban 2901 | 0.08 |
| Water | 40.76 |

This concentrate was then diluted down to 0.45% with water.

Formulation III-1-8 (Comparative)

| | |
|---|---|
| Dehydroacetic acid | 5.00 |
| Dowanol DPM | 9.00 |
| Dehscofix CO130F | 11.25 |
| Dissolvine E39 | 1.50 |
| Foamban 2901 | 0.08 |
| Water | 73.17 |

This concentrate was then diluted down to 0.45% with water.

Formulation III-1-9 (Comparative)

| | |
|---|---|
| Preventol A8 (Teb) | 0.79 |
| Wocosen 50TK (Prop) | 1.50 |
| Dowanol DPM | 9.00 |
| Dehscofix CO130F | 11.25 |
| Dissolvine E39 | 1.50 |
| Foamban 2901 | 0.08 |
| Water | 75.89 |

This concentrate was then diluted down to 0.95% with water.

Formulation III-1-10 (Comparative)

| | |
|---|---|
| Evipol (Cyp) | 1.554 |
| Dowanol DPM | 9.00 |
| Dehscofix CO130F | 11.25 |
| Dissolvine E39 | 1.50 |
| Foamban 2901 | 0.08 |
| Water | 76.62 |

This concentrate was then diluted down to 0.95% with water.

Formulation III-1-11 (Comparative)

| | |
|---|---|
| DDAC | 3.00 |
| Dowanol DPM | 9.00 |
| Dehscofix CO130F | 11.25 |
| Dissolvine E39 | 1.50 |
| Foamban 2901 | 0.08 |
| Water | 75.18 |

This concentrate was then diluted down to 28.6% with water.

Formulation III-1-12 (Comparative)

| | |
|---|---|
| Fenpropimorph | 1.89 |
| Dowanol DPM | 9.00 |
| Dehscofix CO130F | 11.25 |
| Dissolvine E39 | 1.50 |
| Foamban 2901 | 0.08 |
| Water | 76.29 |

This concentrate was then diluted down to 0.95% with water.

Formulation III-1-13 (Comparative)

| | |
|---|---|
| Acticide RS (CMIT) | 26.68 |
| Propylene glycol | 30.00 |
| Caflon TD1010 | 11.11 |
| Water | 32.21 |

This concentrate was then diluted down to 1.5% with water (60 ppm CMIT).

Formulation III-1-14 (Comparative)

| | |
|---|---|
| Acticide 45 (OIT) | 13.34 |
| Propylene glycol | 30.00 |
| Caflon TD 1010 | 11.11 |
| Water | 45.55 |

This concentrate was then diluted down to 0.1% with water (60 ppm OIT).

Formulation III-1-15 (Comparative)

| | |
|---|---|
| Acticide DT (DCOIT) | 13.34 |
| Propylene glycol | 30.00 |
| Caflon TD1010 | 22.22 |
| Water | 34.44 |

This concentrate was then diluted down to 0.1% with water (60 ppm DCOIT).

Formulation III-2-16 (Comparative)

This formulation was formed from 0.95% of the concentrate in III-1-9 and 0.1% of the concentrate in III-1-14 in water.

Formulation III-2-17 (Comparative)

This formulation was formed from 0.95% of the concentrate in III-1-9 and 0.45% of the concentrate in III-1-7 in water.

Formulation III-2-18 (Comparative)

This formulation was formed from 0.45% of the concentrate in III-1-7 and 0.1% of the concentrate in III-1-14 in water.

Formulation III-2-19 (Comparative)

This formulation was formed from 28.6% of the concentrate in III-1-11 and 0.1% of the concentrate in III-1-14 in water.

Formulation III-2-20 (Comparative)

This formulation was formed from 28.6% of the concentrate in III-1-11 and 0.45% of the concentrate in III-1-5 in water.

Formulation III-2-21 (Comparative)

This formulation was formed from 0.45% of the concentrate in III-1-5 and 0.1% of the concentrate in III-1-14 in water.

Formulation III-2-22 (Comparative)

This formulation was formed from 0.95% of the concentrate in III-1-9 and 0.45% of the concentrate in III-1-8 in water.

Formulation III-2-23 (Comparative)

This formulation was formed from 0.45% of the concentrate in III-1-8 and 0.1% of the concentrate in III-1-14 in water.

Formulation III-2-24 (Comparative)

This formulation was formed from 1.5% of the concentrate in III-1-13 and 0.95% of the concentrate in III-1-10 in water.

Formulation III-2-25 (Comparative)

This formulation was formed from 0.95% of the concentrate in III-1-10 and 0.45% of the concentrate in III-1-1 in water.

Formulation III-2-26 (Comparative)

This formulation was formed from 1.5% of the concentrate in III-1-13 and 0.45% of the concentrate in III-1-1 in water.

Formulation III-2-27 (Comparative)

This formulation was formed from 1.5% of the concentrate in III-1-13 and 0.45% of the concentrate in III-1-4 in water.

Formulation III-2-28 (Comparative)

This formulation was formed from 0.95% of the concentrate in III-1-12 and 0.45% of the concentrate in III-1-4 in water.

Formulation III-3-29

This formulation was formed from 1.5% of the concentrate in III-1-13, 0.95% of the concentrate in III-1-12 and 0.45% of the concentrate in III-1-4 in water.

Formulation III-3-30

This formulation was formed from 0.95% of the concentrate in III-1-9, 0.1% of the concentrate in III-1-14 and 0.45% of the concentrate in III-1-8 in water.

Formulation III-3-31

This formulation was formed from 0.95% of the concentrate in III-1-9, 0.1% of the concentrate in III-1-14 and 0.45% of the concentrate in III-1-1 in water.

Formulation III-3-32

This formulation was formed from 0.95% of the concentrate in III-1-9, 0.1% of the concentrate in III-1-14 and 0.45% of the concentrate in III-1-7 in water.

Formulation III-3-33

This formulation was formed from 0.95% of the concentrate in III-1-10, 0.1% of the concentrate in III-1-14 and 0.45% of the concentrate in III-1-5 in water.

Formulation III-3-34

This formulation was formed from 28.6% of the concentrate in III-1-11, 0.1% of the concentrate in III-1-14 and 0.45% of the concentrate in III-1-4 in water.

Formulation III-3-35

This formulation was formed from 28.6% of the concentrate in III-1-11, 0.1% of the concentrate in III-1-14 and 0.45% of the concentrate in III-1-5 in water.

Formulation III-3-36

This formulation was formed from 0.95% of the concentrate in III-1-9, 0.1% of the concentrate in III-1-14 and 0.45% of the concentrate in III-1-3 in water.

Formulation III-3-37

This formulation was formed from 0.95% of the concentrate in III-1-10, 1.5% of the concentrate in III-1-13 and 0.45% of the concentrate in III-1-1 in water.

Formulation III-3-38

This formulation was formed from 0.95% of the concentrate in III-1-10, 1.5% of the concentrate in III-1-13 and 0.45% of the concentrate in III-1-5 in water.

Formulation III-3-39

This formulation was formed from 28.6% of the concentrate in III-1-11, 1.5% of the concentrate in III-1-13 and 0.45% of the concentrate in III-1-2 in water.

Formulation III-3-40

This formulation was formed from 0.95% of the concentrate in III-1-12, 1.5% of the concentrate in III-1-13 and 0.45% of the concentrate in III-1-4 in water.

Formulation III-3-41 (Comparative)

This formulation was formed from 0.95% of the concentrate in III-1-9, 0.1% of the concentrate in III-1-15 and 0.45% of the concentrate in III-1-6 in water.

After drying, the blocks were left outside exposed to the weather on horizontal racks for a total of twenty four weeks, running from September though to March. The tests were carried out in northern England, meaning that the blocks were left exposed through autumn and winter. The blocks were monitored over time to assess the level of any staining. The following scores were attributed to the blocks, depending on the level of observable staining:

| Score | Level of Staining |
|---|---|
| 0 | No staining visible |
| 1 | Insignificantly blue stained. The surface exhibits only individual small blue stained spots with a largest diameter of 2 mm. |
| 2 | Blue stained: the surface is continuously blue stained up to a maximum of one third of the surface area, or partially stained in up to half of the area. |
| 3 | Strongly blue stained. More than half the surface area is continuously stained or more than half the surface area is partially blue stained. |

The tables below summarises the results obtained after 24 weeks' exposure:

| Formulation | Iso-thiazolone | Decay Preservative | Acid | Score |
|---|---|---|---|---|
| Untreated | — | — | — | 3 |
| III-1-1* | — | — | Oleic acid | 3 |
| III-1-2* | — | — | Sodium salicylate | 3 |
| III-1-3* | — | — | Sodium dodecyl benzene sulfonate | 3 |
| III-1-4* | — | — | Abietic acid | 3 |
| III-1-5* | — | — | Sodium benzoate | 3 |
| III-1-6* | — | — | Sodium acetate | 3 |
| III-1-7* | — | — | Methyl benzoate + NaOH | 3 |
| III-1-8* | — | — | Dehydroacetic acid | 3 |
| III-1-9* | — | Tebuconazole/ Propiconazole | — | 3 |
| III-1-10* | — | Cyproconazole | — | 3 |
| III-1-11* | — | DDAC | — | 2 |
| III-1-12* | — | Fenpropimorph | — | 3 |
| III-1-13* | CMIT | — | — | 1 |
| III-1-14* | OIT | — | — | 2 |
| III-1-15* | DCOIT | — | — | 3 |
| III-2-16* | OIT | Tebuconazole/ Propiconazole | — | 2 |
| III-2-17* | — | Tebuconazole/ Propiconazole | Methyl benzoate + NaOH | 3 |
| III-2-18* | OIT | — | Methyl benzoate + NaOH | 1 |
| III-2-19* | OIT | DDAC | — | 1 |
| III-2-20* | — | DDAC | Sodium benzoate | 2 |
| III-2-21* | OIT | — | Sodium benzoate | 1 |
| III-2-22* | — | Tebuconazole/ Propiconazole | Dehydroacetic acid | 3 |
| III-2-23* | OIT | — | Dehydroacetic acid | 2 |
| III-2-24* | CMIT | Cyproconazole | — | 1 |
| III-2-25* | — | Cyproconazole | Oleic acid | 3 |
| III-2-26* | CMIT | — | Oleic acid | 1 |
| III-2-27* | CMIT | — | Abietic acid | 1 |
| III-2-28* | — | Fenpropimorph | Abietic acid | 3 |
| III-3-29 | CMIT | Fenpropimorph | Abietic acid | 1 |
| III-3-30 | OIT | Tebuconazole/ Propiconazole | Dehydroacetic acid | 1 |
| III-3-31 | OIT | Tebuconazole/ Propiconazole | Oleic acid | 1 |
| III-3-32 | OIT | Tebuconazole/ Propiconazole | Methyl benzoate + NaOH | 1 |
| III-3-33 | OIT | Cyproconazole | Sodium benzoate | 1 |
| III-3-34 | OIT | DDAC | Abietic acid | 1 |
| III-3-35 | OIT | DDAC | Sodium benzoate | 1 |
| III-3-36 | OIT | Tebuconazole/ Propiconazole | Sodium dodecyl benzene sulfonate | 1 |
| III-3-37 | CMIT | Cyproconazole | Oleic acid | 1 |
| III-3-38 | CMIT | Cyproconazole | Sodium benzoate | 1 |
| III-3-39 | CMIT | DDAC | Sodium salicylate | 1 |
| III-3-40 | CMIT | Fenpropimorph | Abietic acid | 1 |
| III-3-41* | DCOIT | Tebuconazole/ Propiconazole | Sodium acetate | 3 |

*denotes Comparative Example
OIT and CMIT were used at 60 ppm, while DCOIT was used at 30 ppm.

The data in the above tables show that each of the wood treated with a composition of the invention achieve a score of 1 after 24 weeks' exposure, meaning that only insignificant levels of surface staining are observed. In contrast, the comparative composition containing a saturated acid (formulation III-3-66) only achieves a score of 2, meaning that significant levels of surface staining are observed.

In addition, the data show that the use of the combination of three components in accordance with the in accordance with the invention achieves better results that the individual ingredients when used on their own or in combination with only one other component. For example, formulations III-1-8, III-1-9, III-1-14, III-2-22 and III-2-23 each give scores of 2 or 3, whereas formulation III-3-30 achieves a score of 1. Thus, the combination of OIT, tebuconazole/propiconazole and dehydroacetic acid is achieving much better results than could have been expected based on the results of only one or two of these ingredients being used in combination, i.e. three way synergy is present.

The data also show that some of the two-way combinations are also very effective even without the third ingredient. Thus, combinations of OIT and sodium benzoate or methyl benzoate/NaOH achieve a score of 1 even without the organic fungicidal timber decay preservative.

The result obtained for formulation III-1-13 shows that CMIT is very effective even when used alone at 60 ppm, achieving a score of 1. However, the addition of an unsaturated acid and organic fungicidal timber decay preservative still leads to a visible improvement in the treated wood, even if the improvement is not shown in the score that the wood achieves.

Figure 19:
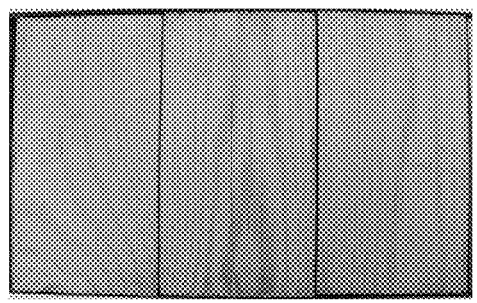
FIG. 19 is a photograph of wood treated with formulation III-1-13 after exposure for 24 weeks.
Figure 20A:
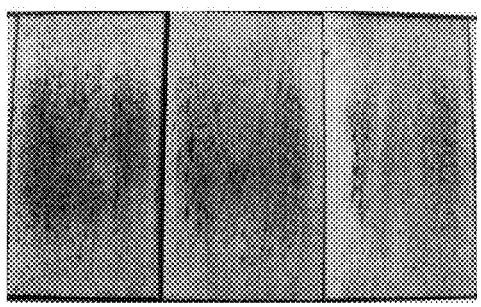
FIG. 20a is a photograph of wood treated with formulation III-2-28 after exposure for 24 weeks.
Figure 20B:
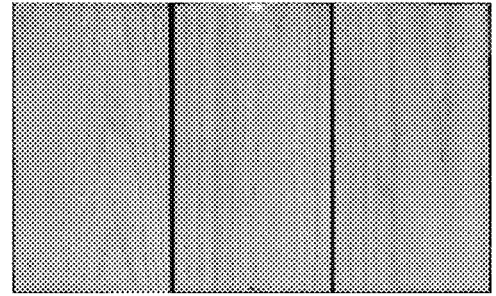
FIG. 20b is a photograph of wood treated with formulation III-3-40 after exposure for 24 weeks.

Thus, FIG. 19 shows blocks treated with CMIT on its own (formulation III-1-13), while FIGS. 20a and 20b show blocks treated with fenpropimorph and abietic acid (formulation III-2-28) and together with CMIT (formulation III-3-40). FIG. 20a clearly shows that formulation III-2-28 is ineffective at preventing surface staining, yet when used in combination with CMIT provides blocks that are even less stained that when using CMIT alone (compare FIG. 20b and FIG. 19). Thus, abietic acid and fenpropimorph enhance the efficacy of CMIT at preventing surface staining even though these compounds have no significant activity at preventing surface staining when used alone.

Figure 21A:
FIG. 21a is a photograph of wood treated with formulation III-2-25 after exposure for 24 weeks.
Figure 21B:
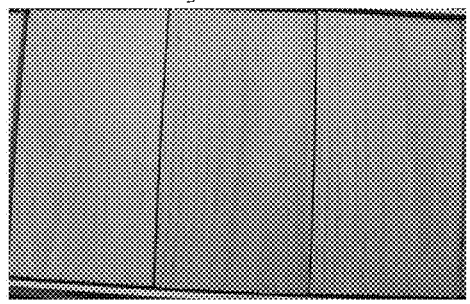
FIG. 21b is a photograph of wood treated with formulation III-3-37 after exposure for 24 weeks.
Figure 22A:
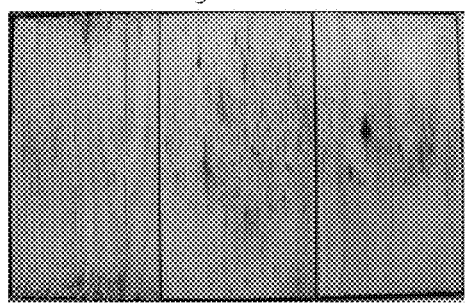
FIG. 22a is a photograph of wood treated with formulation IV-1 after exposure for 24 weeks.
Figure 22B:
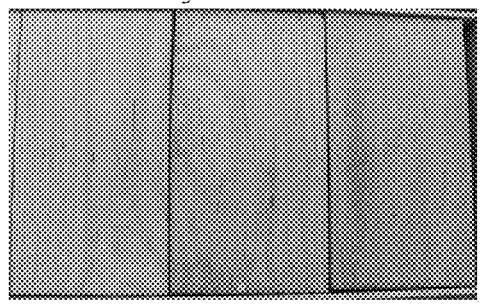
FIG. 22b is a photograph of wood treated with formulation IV-2 after exposure for 24 weeks.
Figure 22C:
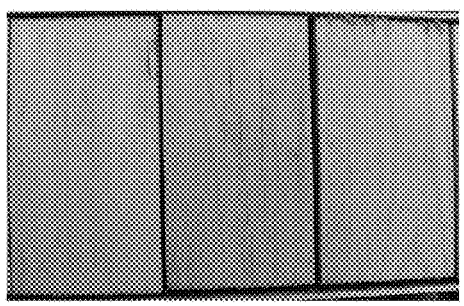
FIG. 22c is a photograph of wood treated with formulation IV-3 after exposure for 24 weeks.
Figure 22D:
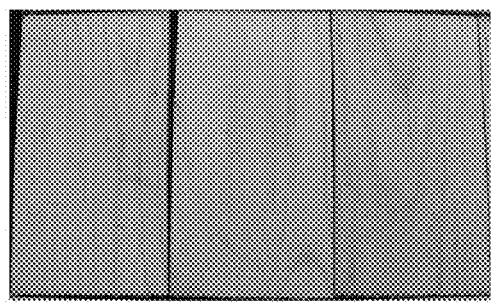
FIG. 22d is a photograph of wood treated with formulation IV-4 after exposure for 24 weeks.

The same result is seen with cyproconazole and oleic acid, as shown in FIG. 21a (cyproconazole and oleic acid, formulation III-2-25) and 21b (CMIT, cyproconazole and oleic acid, formulation III-3-37).

Example 4

Using the same protocol as Example 3, the following formulations were tested:

Formulation IV-1

This formulation was formed from 0.95% of the concentrate in III-1-9, 0.008% of the concentrate in III-1-14 and 0.45% of the concentrate in III-1-5 in water.

Formulation IV-2

This formulation was formed from 0.95% of the concentrate in III-1-9, 0.016% of the concentrate in III-1-14 and 0.45% of the concentrate in III-1-5 in water.

Formulation IV-3

This formulation was formed from 0.95% of the concentrate in III-1-9, 0.05% of the concentrate in III-1-14 and 0.45% of the concentrate in III-1-5 in water.

Formulation IV-4

This formulation was formed from 0.95% of the concentrate in III-1-9, 0.1% of the concentrate in III-1-14 and 0.45% of the concentrate in III-1-5 in water.

Formulation IV-5

This formulation was formed from 0.95% of the concentrate in III-1-9, 0.17% of the concentrate in III-1-14 and 0.45% of the concentrate in III-1-5 in water.

Each of the formulations therefore contained sodium benzoate, tebuconazole, propiconazole and OIT, but with the level of OIT varied from 5 ppm to 100 ppm. The results obtained after 24 weeks exposure are shown in the following table:

| Formulation | OIT level (ppm) | Score |
|---|---|---|
| IV-1 | 5 | 2 |
| IV-2 | 10 | 2 |
| IV-3 | 30 | 1 |
| IV-4 | 60 | 1 |
| IV-5 | 100 | 1 |

The data in the table show that best scores are obtained by using OIT levels above 10 ppm. However, even at 10 ppm the performance of this composition is surprisingly good. Photographs of the blocks treated with formulations IV-1 to IV-4 are shown in FIGS. 22a-22d, from which it can clearly be seen that even at 10 ppm OIT the composition provides excellent protection against surface staining.

Example 5

A treatment solution was formed from the following formulation:

| Ingredient | % w/w |
|---|---|
| Preventol A8 (96.5% a.i Tebuconazole) | 0.389 |
| Permethrin 75:25 cis:trans (93.7% a.i.) | 0.130 |
| Wocosen 15TK (15.6% Propiconazole) | 7.21 |
| Foamban HV810G | 0.35 |
| Dowanol DPM | 7.0 |
| Ethoduomeen T25 | 2.0 |
| Propionic acid | 1.72 |
| Dissolvine E39 | 1.5 |
| Dehscofix CO130F | 4.75 |
| Sodium benzoate | 22.5 |
| Water | 52.451 |

The formulation was diluted to working strength (2.0% w/w) with water and combined with OIT at levels of 60 ppm.

Figure 23A:
FIG. 23a is a photograph of untreated Scottish Larch as used in Example 5 prior to exposure for 16 months.
Figure 23B:
FIG. 23b is a photograph of Scottish Larch treated with the formulation of Example 5 prior to exposure for 16 months.
Figure 24A:
FIG. 24a is a photograph of untreated Scottish Larch as used in Example 5 after exposure for 16 months.
Figure 24B:
FIG. 24b is a photograph of Scottish Larch treated with the formulation of Example 5 after exposure for 16 months.

The solution was applied to Scottish Larch decks which were left exposed to the atmosphere for 16 months. FIGS. 23a and 23b show the untreated (control) and treated decking prior to exposure, while FIGS. 24a and 24b show the untreated (control) and treated decking after 16 months. These Figures clearly show that the untreated wood developed significant surface staining, while the treated wood remained relatively stain free for the entire period. The formulation of the invention therefore provides excellent protection against surface staining for a significant period of time, well in excess of 12 months.

The invention claimed is:

1. A method of protecting a substrate of wood or other cellulosic material which comprises applying to the substrate or treating the substrate with an effective amount of a formulation comprising:

an isothiazolone in an amount from 10 ppm but less than 500 ppm, the isothiazolone selected from the group consisting of methylisothiazol-3-one, 5-chloro-2-methyl-4-isothiazolin-3-one, octylisothiazol-3-one, 1,2-benzisothiazol-3(2H)-one, N-methyl-1,2-benzisothiazol-3-one, N-(n-butyl)-1,2-benzisothiazol-3-one, 4,5-dichloro-2-n-octyl-4-isothiazolin-3-one, and combinations thereof;

an organic fungicidal timber decay preservative, wherein the organic fungicidal timber decay preservative selected from the group consisting of a quaternary ammonium compound, an azole, a fungicidal heterocyclic compound, or mixtures thereof in an amount from 100 ppm to 300 ppm, wherein the organic fungicidal timber decay preservative is free of thiabendazole; and an unsaturated carboxylic or sulphonic acid, a salt, ester or anhydride thereof in an amount from 1000 to 10000 ppm, the unsaturated carboxylic or sulphonic acid being selected from the group consisting of (i) abietic acid, pimaric acid, benzoic acid, salicylic acid, a dodecyl benzene sulfonic acid, a dehydroacetic acid, or a salt, ester or anhydride thereof, (ii) a linear unsaturated carboxylic acid having from 4 carbons to 22 carbons, a salt, ester or anhydride thereof, and (iii) an aromatic acid is of formula (I):

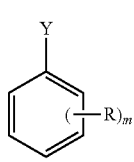

(I)

wherein Y denotes $CO_2M$ or $SO_3M$;
each R independently denotes $C_1$-$C_{12}$ alkyl, OH, OMe, OEt, $NH_2$, $NMe_2$, $CO_2M$ or halogen,
wherein two R groups may optionally form naphthyl;
M denotes H, K or Na; and
m denotes 0 to 2,
or a salt, ester or anhydride of formula (I); and
wherein the formulation inhibits surface staining for at least 24 weeks; and
wherein the formulation is free of haloalkynyl compounds and biocidal metal ions.

2. The method as defined in claim 1, wherein the salt is an alkali metal salt.

3. The method as defined in claim 1, wherein the aromatic acid or salt thereof is selected from the group consisting of benzoic acid and sodium benzoate.

4. The method as defined in claim 1, wherein the unsaturated carboxylic or sulphonic acid is selected from the group consisting of abietic acid, sodium abietate, pimaric acid and sodium pimarate.

5. The method as defined in claim 1, wherein the unsaturated carboxylic acid, salt, ester or anhydride thereof is selected from the group consisting of oleic acid, sodium oleate or potassium oleate.

6. The method as defined in claim 1, wherein the isothiazolone is 4,5-dichloro-2-n-octyl-4-isothiazolin-3-one.

7. The method as defined in claim 1, wherein the organic fungicidal timber decay preservative is an azole.

8. The method as defined in claim 7, wherein the azole compound is an imidazole, a 1,2,4-triazole, or mixtures of both.

9. The method as defined in claim 8, wherein the imidazole is a benzimidazole.

10. The method as defined in claim 8, wherein the 1,2,4-triazole is selected from the group consisting of compounds of formula (IV):

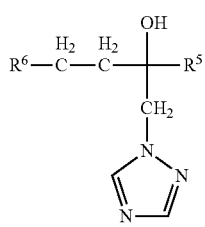

(IV)

wherein $R^5$ represents a branched or straight chain $C_{1-5}$ alkyl group; and
$R^6$ represents a phenyl group optionally substituted by one or more substituents selected from halogen, $C_{1-3}$ alkyl, $C_{1-3}$ alkoxy, phenyl or nitro; and compounds of formula (V):

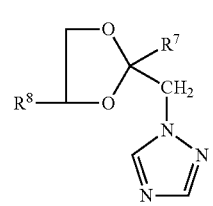

(V)

wherein $R^7$ is as defined for $R^6$ above; and
$R^8$ represents a hydrogen atom or a branched or straight chain $C_{1-5}$ alkyl group; or selected from the group consisting of triadimefon, triadimenol, triazbutil, cyproconazole, difenoconazole, fluquinconazole, flusilazole, tebuconazole, uniconazole, diniconazole, bitertanol, hexaconazole, flutriafol, epoxyconazole, tetraconazole, penconazole, ipconazole, prothiazole and mixtures thereof.

11. The method as defined in claim 10, wherein the 1,2,4-triazole is selected from the group consisting of triadimefon, triadimenol, triazbutil, propiconazole, cyproconazole, difenoconazole, fluquinconazole, tebuconazole, flusilazole, uniconazole, diniconazole, bitertanol, hexaconazole, azaconazole, flutriafol, epoxyconazole, tetraconazole, penconazole, ipconazole, prothiazole and mixtures thereof.

12. The method as defined in claim 10, wherein the 1,2,4-triazole is selected from the group consisting of propiconazole, tebuconazole, and mixtures thereof.

13. The method as defined in claim 1, wherein the formulation is in a liquid form.

14. The method as defined in claim 13, wherein the ratio of azole to isothiazolone is 10:1 to 2:1 w/w.

15. The method as defined in claim 13, wherein the formulation is an emulsion.

16. The method as defined in claim 1, wherein the organic fungicidal timber decay preservative is an azole, and wherein the ratio of azole to isothiazolone is at least 3:2.

17. The method as defined in claim 1, wherein the total amount of isothiazolone in the solution is at least 30 ppm to 300 ppm.

18. The method as defined in claim 1, wherein the formulation is free of biocidal metal ions.

19. A method of protecting a substrate of wood or other cellulosic material which comprises applying to the substrate or treating the substrate with an effective amount of a formulation in the form of an emulsion, comprising:
an isothiazolone in an amount from 10 ppm but less than 500 ppm, the isothiazolone selected from the group consisting of methylisothiazol-3-one, 5-chloro-2-methyl-4-isothiazolin-3-one, octylisothiazol-3-one, 1,2-benzisothiazol-3(2H)-one, N-methyl-1,2-benzisothiazol-3-one, N-(n-butyl)-1,2-benzisothiazol-3-one, 4,5-dichloro-2-n-octyl-4-isothiazolin-3-one, and combinations thereof;
an organic fungicidal timber decay preservative, wherein the organic fungicidal timber decay preservative is free of thiabendazole, wherein the organic fungicidal timber decay preservative selected from the group consisting of a quaternary ammonium compound, an azole, a fungicidal heterocyclic compound, or mixtures thereof in an amount from 100 ppm to 300 ppm, wherein the organic fungicidal timber decay preservative is free of thiabendazole; and an unsaturated carboxylic or sulphonic acid, a salt, ester or anhydride thereof, the unsaturated carboxylic or sulphonic acid being selected from the group consisting of
(i) an unsaturated cyclic carboxylic or sulphonic acid being a resin acid, a salt, ester or anhydride thereof,
(ii) a linear unsaturated carboxylic acid having from 4 carbons to 22 carbons, a salt, ester or anhydride thereof, and
(iii) an aromatic acid is of formula (I):

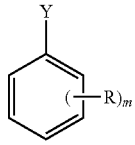

wherein Y denotes $CO_2M$ or $SO_3M$;
each R independently denotes $C_1$-$C_{12}$ alkyl, OH, OMe, OEt, $NH_2$, $NMe_2$, $CO_2M$ or halogen,
wherein two R groups may optionally form naphthyl;
M denotes H, K or Na; and
m denotes 0 to 5, or a salt, ester or anhydride of formula (I); and wherein the formulation is free of haloalkynyl compounds and biocidal metal ions.

* * * * *

UNITED STATES PATENT AND TRADEMARK OFFICE
CERTIFICATE OF CORRECTION

PATENT NO.         : 11,457,630 B2
APPLICATION NO.    : 15/354585
DATED              : October 4, 2022
INVENTOR(S)        : Paul Warburton, Lee Mason and Andrew Stewart Hughes It is certified that error appears in the above-identified patent and that said Letters Patent is hereby corrected as shown below:

On the Title Page

Item (54) and in the Specification, Column 1, Lines 1-4, Title:
"Wood Preservative Formulations Comprising Isothtiazolones Which Provide Protection Against Surface Staining" should be "Wood Preservative Formulations Comprising Isothiazolones Which Provide Protection Against Surface Staining".

Item (72) Inventor Name:
"Lee MAson" should be "Lee Mason".

Item (73) Assignee Name:
"Arch Timber Protection Limited" should be "Arch Wood Protection, Inc.".

Signed and Sealed this
Seventh Day of February, 2023

Katherine Kelly Vidal
*Director of the United States Patent and Trademark Office*